United States Patent
Kato

(10) Patent No.: US 7,163,665 B2
(45) Date of Patent: *Jan. 16, 2007

(54) APPARATUS FOR DECOMPOSING GASEOUS ALIPHATIC HYDROCARBON HALIDE COMPOUNDS

(75) Inventor: Kinya Kato, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

This patent is subject to a terminal disclaimer.

(21) Appl. No.: 10/167,549

(22) Filed: Jun. 12, 2002

(65) Prior Publication Data

US 2002/0189929 A1 Dec. 19, 2002

Related U.S. Application Data

(62) Division of application No. 09/458,685, filed on Dec. 10, 1999, now Pat. No. 6,497,795.

(30) Foreign Application Priority Data

Dec. 16, 1998 (JP) ................... 10-357623
Aug. 30, 1999 (JP) ................... 11-243143

(51) Int. Cl.
B01J 19/08 (2006.01)

(52) U.S. Cl. .................. 422/186.3; 204/275.1

(58) Field of Classification Search ............. 422/186.3; 204/275.1
See application file for complete search history.

(56) References Cited

U.S. PATENT DOCUMENTS

| | | | |
|---|---|---|---|
| 3,649,493 A | 3/1972 | Meiners et al. | 204/157.5 |
| 3,845,317 A * | 10/1974 | Lindwall et al. | 422/186.3 |
| 4,009,099 A | 2/1977 | Jeris | 210/3 |
| 4,236,992 A | 12/1980 | Themy | 204/229.7 |
| 4,361,471 A | 11/1982 | Kosarek | 210/478 |
| 4,555,323 A | 11/1985 | Collier | 204/258 |
| 4,761,208 A | 8/1988 | Gram et al. | 204/95 |
| 4,927,621 A | 5/1990 | Repman et al. | 423/488 |
| 5,039,383 A | 8/1991 | Spotnitz et al. | 207/128 |
| 5,260,036 A | 11/1993 | Weigold et al. | 422/186.3 |
| 5,340,555 A | 8/1994 | Mashio et al. | 204/158.2 |
| 5,370,740 A | 12/1994 | Chao et al. | 134/1 |
| 5,393,394 A | 2/1995 | Ikeda et al. | 210/3 |
| 5,460,792 A | 10/1995 | Rosenbaum | 423/245.3 |
| 5,494,574 A | 2/1996 | Unterman et al. | 210/150 |
| 5,525,008 A | 6/1996 | Wilson | 405/128 |
| 5,582,741 A | 12/1996 | Kenmoku et al. | 210/748 |
| 5,611,642 A | 3/1997 | Wilson | 405/128 |
| 5,616,234 A | 4/1997 | Rhees et al. | 205/500 |
| 5,714,665 A | 2/1998 | Ohtake | 204/157.15 |

(Continued)

FOREIGN PATENT DOCUMENTS

DE 43 30518 A1 3/1995

(Continued)

OTHER PUBLICATIONS

Patent Abstracts of Japan—vol. 1998, No. 01 (1998); Title: Photolysis of Organochlorine Compound; Appln. No. 09-234338; published Jan. 30, 1998.

(Continued)

*Primary Examiner*—Kishor Mayekar
(74) *Attorney, Agent, or Firm*—Fitzpatrick, Cella, Harper & Scinto

(57) ABSTRACT

A method for decomposing a gaseous aliphatic hydrocarbon halide compound more simply is provided. The method includes the steps of mixing the gaseous aliphatic hydrocarbon halide compound and a chlorine gas-containing gas and emitting light to a mixture gas of the gaseous aliphatic hydrocarbon halide compound and the chlorine gas.

11 Claims, 11 Drawing Sheets

U.S. PATENT DOCUMENTS

| | | | |
|---|---|---|---|
| 5,832,361 A | 11/1998 | Foret | 422/186 |
| 5,980,727 A | 11/1999 | Putz et al. | 205/688 |

FOREIGN PATENT DOCUMENTS

| | | |
|---|---|---|
| DE | 44 00308 A1 | 7/1995 |
| EP | 0 841 305 A | 2/1994 |
| JP | 6-246133 | 6/1964 |
| JP | 49-45027 | 4/1974 |
| JP | 51-23467 | 2/1976 |
| JP | 52-47459 | 12/1977 |
| JP | 79-029993 B * | 9/1979 |
| JP | 57-166175 | 10/1982 |
| JP | 60-261590 | 12/1985 |
| JP | 62-191025 | 8/1987 |
| JP | 62-191095 | 8/1987 |
| JP | 63-218293 | 9/1988 |
| JP | 1-180293 | 1/1989 |
| JP | 2-243501 | 9/1990 |
| JP | 3-38297 | 2/1991 |
| JP | 3-074507 | 3/1991 |
| JP | 5-115722 | 5/1993 |
| JP | 5-149127 | 6/1993 |
| JP | 6-31135 | 2/1994 |
| JP | 6-182151 | 7/1994 |
| JP | 7-000819 | 1/1995 |
| JP | 7-51675 | 2/1995 |
| JP | 7-116467 | 5/1995 |
| JP | 7-144137 | 6/1995 |
| JP | 8-000759 | 1/1996 |
| JP | 8-104665 | 4/1996 |
| JP | 8-141367 | 6/1996 |
| JP | 08-155464 A * | 6/1996 |
| JP | 8-243351 | 9/1996 |
| JP | 08-257570 | 10/1996 |
| JP | 8-281271 | 10/1996 |
| JP | 9-10554 | 1/1997 |
| JP | 9-234338 | 9/1997 |
| WO | WO 94/02423 | 2/1994 |
| WO | WO 94/03399 | 2/1994 |

OTHER PUBLICATIONS

Patent Abstracts of Japan—vol. 1997, No. 01 (1997); Title: Decomposition Method of Organic Chlorine Compound; Appln. No. 08-243351; published Jan. 31, 1997.

Patent Abstracts of Japan—vol. 018, No. 043 (C-1156) (1994); Title: Device for Decomposing Low Boiling Point Organic Halogen; published Jan. 24, 1994.

Patent Abstracts of Japan—vol. 018, No. 525 (C-1257) (1994); Title: Treatment of Exhaust Gas; published Oct. 5, 1994.

Ute Heinz & Hans Jürgen Rehm, "Biodegradation of Dichloroacetic Acid by Entrapped and Absorptive Immobilized *Xanthobacter Autotrophicus* GJ10," 40 *Appl. Microbiol. Biotechnol.* 158-164 (1993).

K.L. Müller et al., "Die Phtochemische Durch Chlor Sensibilisierte Oxydation von Trichloräthylen zu Dichloracetylchlorid," B37 *H.Z. Phys. Chem.* 365-373 (1937) (With English Translation).

Patent Abstracts of Japan, vol. 018, No. 043 (C-1156), Jan. 24, 1994 (JP 05 269374A).

Water Processing Technology, vol. 37, No. 5 (1996) and Translation (241-250).

Nakonishi, "Present Status . . . Management," *Res. Inst. Env. Techn.* (1995) 220-227 and Translation.

G. Huybrechts et al., "Gas-Phase Chlorine-Photosynthesized Oxidation of Trichloroethylene," 62 *Trans. Faraday Soc.* 2191-2199 (1962).

English Translation of JP 7-116467, (no date).
English Translation of JP 8-243351, (no date).
Computer Translation of JP 7-1164467, (no date).
Computer Translation of JP 8-243351, (no date).

* cited by examiner

APPARATUS FOR DECOMPOSING GASEOUS ALIPHATIC HYDROCARBON HALIDE COMPOUNDS This application is a division of U.S. application Ser. No. 09/458,685 filed Dec. 10, 1999, now U.S. Pat. No. 6,497,795.

BACKGROUND OF THE INVENTION

1. Field of the Invention

This invention relates to a method for decomposing a gaseous aliphatic halide compound and a decomposing apparatus employed therefor.

2. Related Background Art

With development of industrial technology in the recent years, a tremendous amount of aliphatic hydrocarbon halide compound (for example, ethylene chloride, methane chloride or the like) is used, its waste treatment becomes a serious problem. In addition, these used gases cause environmental problems such as contamination of natural environment, and numerous efforts are made for its solution. A specific treatment method is described as follows: For example, as a method for decomposing ethylene chloride using an oxidizing agent or a catalyst, there has been known an ozone decomposition method (Japanese Patent Application Laid-Open No. 3-38297) or an ultraviolet-ray irradiation method under the existence of hydrogen peroxide (Japanese Patent Application Laid-Open No. 63-218293) and the like. In addition, there is suggested use of sodium hypochlorite as an oxidizing agent (U.S. Pat. Nos. 5,525,008 and 5,611,642). In addition, there has been proposed a method for combining a sodium hypochlorite and ultraviolet-ray irradiation with each other (U.S. Pat. No. 5,582,741). Further, there has been known a method for suspending a photo catalyst and a liquid-like ethylene chloride consisting of semiconductor oxide particles such as titanium oxide under alkali conditions, and decomposing them by light emission (Japanese Patent Application Laid-Open No. 7-144137).

In addition to the foregoing, a photo-decomposition method for causing ultraviolet rays to be irradiated in a gas phase without using an oxidizing agent has already been attempted. For example, there has been proposed a method for ultraviolet-ray irradiation treatment of an exhaust gas containing an organic halogen compound to make an acidic decomposition gas, and then, rinsing the gas with an alkali to make it harmless (Japanese Patent Application Laid-Open No. 62-191025); an apparatus for applying air ventilation and air seasoning to exhaust liquid containing organic halide compound and ultraviolet-ray irradiation of a gas to be exhausted, and then, rinsing the gas with an alkali (Japanese Patent Application Laid-Open No. 62-191095) or the like. In addition, probably, as an example which is estimated as reductive decomposition, there has been known decomposition of ethylene chloride using iron powder (Japanese Patent Application Laid-Open No. 8-257570). Reductive decomposition has been reported for decomposition of PCE using silicon particles.

SUMMARY OF THE INVENTION

In spite of the foregoing prior art, any or all of these methods is not sufficiently practical in apparatus arrangement or the like required for decomposition efficiency or treatment, and there is demanded a method for efficiently decomposing a gaseous aliphatic hydrocarbon halide compound with a simpler apparatus arrangement.

The inventors held a variety of discussions for these technical demands. As a result, when light was emitted to a mixture gas of a gaseous aliphatic hydrocarbon halide compound and a gas containing a chlorine gas, the inventors found out that an aliphatic hydrocarbon halide compound is decomposed, and achieved the present invention.

An object of the present invention is to provide a method for decomposing a gaseous aliphatic hydrocarbon halide compound more simply.

Another object of the present invention is to provide a simple apparatus capable of efficiently decomposing a gaseous aliphatic hydrocarbon halide compound.

According to a first aspect of the present invention, there is provided a method for decomposing a gaseous aliphatic hydrocarbon halide compound according to one embodiment of the present invention is characterized by comprising the steps of: mixing a gaseous aliphatic hydrocarbon halide compound and a gas containing a chlorine gas; and emitting light to a mixture gas of the gaseous aliphatic hydrocarbon halide compound and the chlorine gas.

According to a second aspect of the present invention, there is an apparatus for decomposing a gaseous aliphatic hydrocarbon halide compound according to one embodiment of the present invention, capable of achieving the foregoing objects, is characterized by comprising: means for bringing a gas containing chlorine gas into contact with a gaseous aliphatic hydrocarbon halide compound in a closed space; and means for emitting light to a mixture gas of the gas in the closed space and the gaseous aliphatic hydrocarbon halide compound.

DETAILED DESCRIPTION OF THE PREFERRED EMBODIMENTS (Method for Decomposing a Gaseous Aliphatic Hydrocarbon Halide Compound)

A method for decomposing a gaseous aliphatic hydrocarbon halide compound according to one embodiment of the present invention is characterized by comprising: the step of mixing a gas containing a chlorine gas and a gaseous aliphatic hydrocarbon halide compound to be decomposed, and emitting light to the mixture gas.

Figure 1:
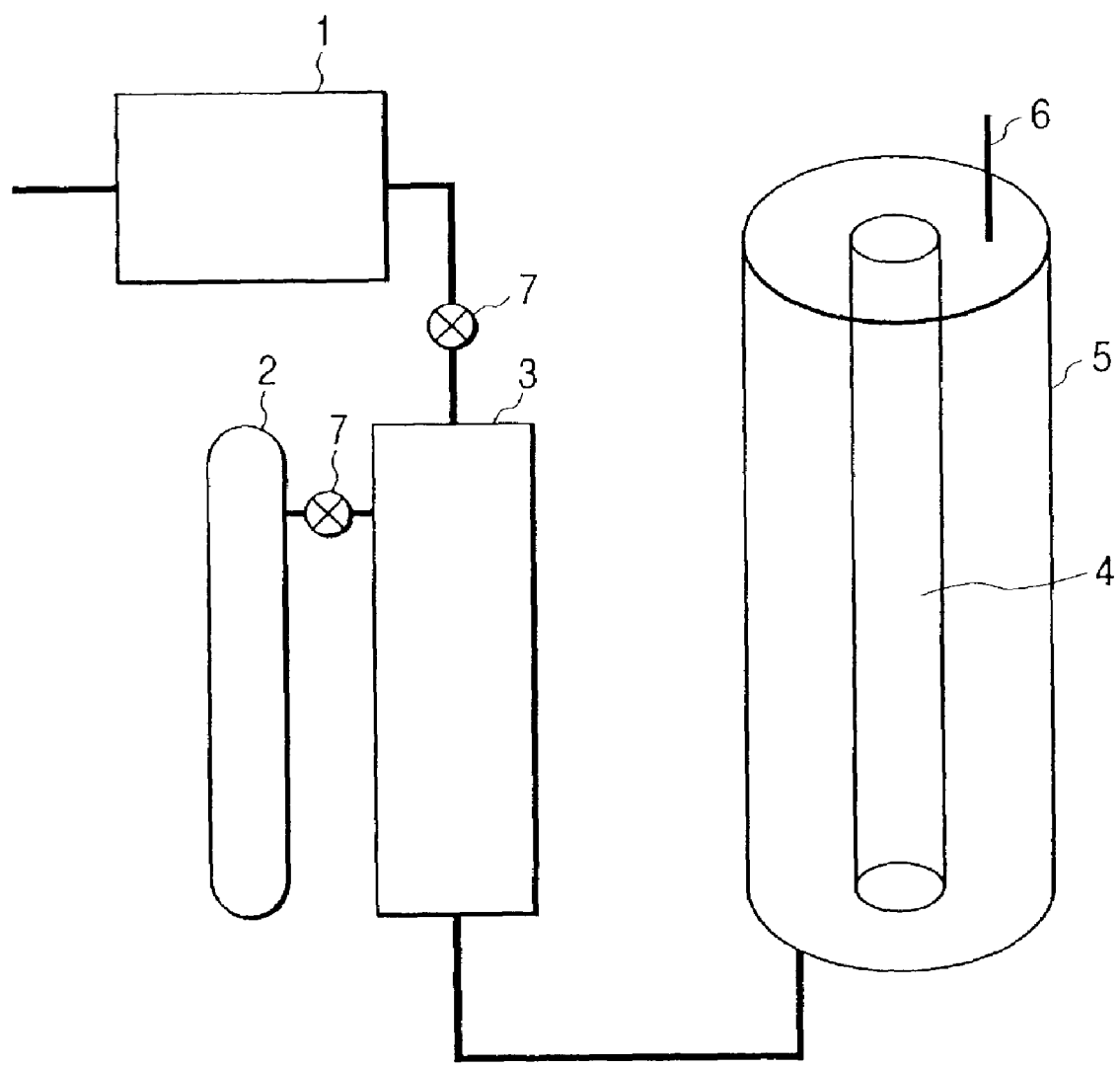
FIG. 1 is a schematic view of an apparatus for decomposing a gaseous aliphatic hydrocarbon halide compound according to one embodiment of the present invention.

(Decomposing Apparatus—FIG. 1)

Such decomposition method will be described by referring to FIG. 1 showing one embodiment of a decomposing apparatus according to the present invention. In FIG. 1, reference numeral 1 denotes a tank for storing gas targeted for decomposition; and reference numeral 2 denotes a cylinder having a gas containing a chlorine gas stored therein. A gas containing the gas targeted for decomposition and the chlorine gas is mixed in a mixture tank 3 at a predetermined concentration by gas mixing means 7. The mixture gas in the mixture tank 3 is introduced into a reaction vessel 5; light is emitted to a mixture gas during a predetermined time interval by light emitting means designated by 4; and the gas targeted for decomposition is decomposed. The decomposed gas is exhausted from an exhaust pipe 6. The mixture tank is not always required, and may be arranged so as to directly mix the gas in the reaction vessel.

(Gaseous Aliphatic Hydrocarbon Halide Targeted for Decomposition/Aromatic Halide Compound)

An aliphatic hydrocarbon halide compound targeted for decomposition includes ethylene chloride, methane chloride and the like, for example. Specifically, an ethylene chloride includes 1 to 4 chloride substitution body of ethylene, i.e., chloroethylene, dichloroethylene, trichloroethylene, and tetrachloroethylene. Further, dichloroethylene may include 1,1-dichloroethylene (vinylidene chloride), cis-1,2-dichloroethylene, and trans-1,2-dichloroethylene. A methane chloride includes a methane chloride substitution body, for example, chloromethane, dichloromethane, trichloromethane or the like. Furthermore, an aromatic halide compound targeted for decomposition includes chlorobenzene or the like, for example.

(Gas Containing Chlorine gas)

With respect to a gas containing chlorine gas, a chlorine gas or an air containing the chlorine gas at a predetermined rate may be employed. With a mixture rate of a gas targeted for decomposition and a gas containing a chlorine gas, the concentration of the chlorine gas in the gas is preferably adjusted so as to be 5 ppm or more and 1000 ppm or less. In particular, when the concentration of the chlorine gas in the mixture gas is between 20 ppm and 500 ppm, and is further between 80 ppm and 300 ppm, the decomposition efficiency of the gas targeted for decomposition is significant.

(Method for Producing a Gas Containing a Chlorine Gas—Air Seasoning of Chlorine Solution)

Figure 2:
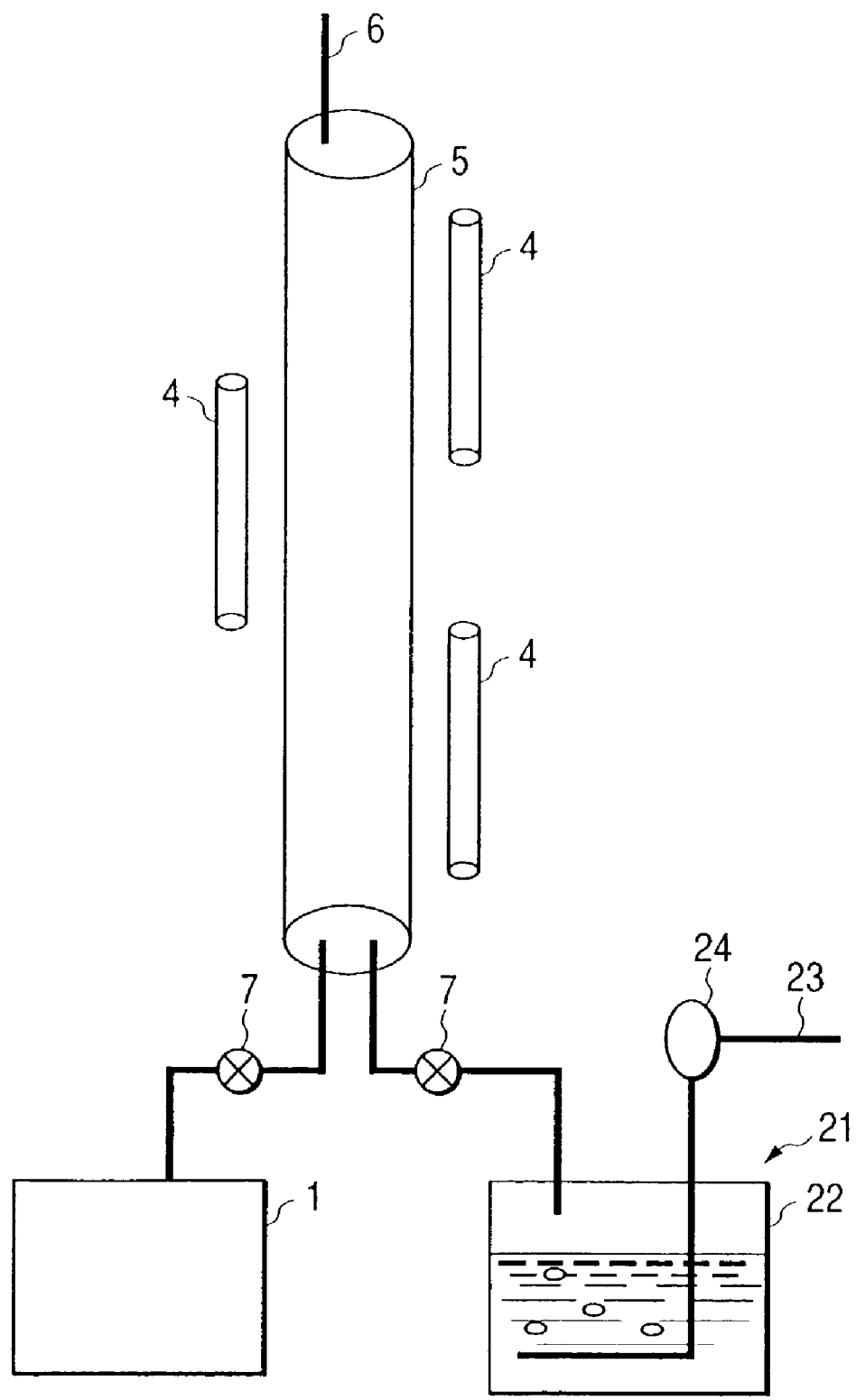
FIG. 2 is a schematic view of an apparatus for decomposing a gaseous aliphatic hydrocarbon halide compound according to another embodiment of the present invention.

As a gas containing a chlorine gas, for example, there may be employed an air containing a chlorine gas obtained by air seasoning to (blowing air into) a solution containing chlorine. FIG. 2 is a schematic view showing one embodiment thereof, wherein reference numeral 21 denotes means for generating an air containing a chlorine gas, comprising: a water vessel 22 containing a chlorine solution; a pipe 23 for blowing an air into the solution; a valve 24 for adjusting a quantity of air. The air passing through the chlorine solution becomes an air containing a chlorine gas, and is introduced into a reaction vessel 5. As a chlorine solution to be poured into the water vessel 22, there is employed a chlorine solution of 2 to 2000 mg/l in available chlorine concentration; in particular, a solution having its characteristics in which a hydrogen ion concentration (pH value) is 1 or more and 4 or less; an oxidation-reduction potential (active electrode: platinum electrode and reference electrode: silver-silver chloride electrode) is 800 to 1500 mV, and a chlorine concentration is 5 to 150 mg/l; or a solution or the like having characteristics in which a hydrogen ion concentration (pH value) is 4 or more and 10 or less, oxidation reduction potential (active element: platinum electrode and reference electrode: silver-silver chloride electrode) is 300 to 1100 mV, and a chloride concentration is 2 to 100 mg/l.

(Method for Producing a Gas Containing a Chlorine Gas—Air Seasoning of Synthetic Functional Water)

Such solution is obtained by dissolving a hypochlorite (sodium hypochlorite or potassium hypochlorite) in water. In addition, when an inorganic or organic acid is contained in this solution, a chlorine gas can be generated efficiently. The inorganic acid can be hydrochloric acid, hydrofluoric acid, sulfuric acid, phosphoric acid, and boric acid or the like, and the organic acid can be acetic acid, formic acid, malic acid, citric acid, and oxalic acid. The concentration of chlorine in the gas containing chlorine and being mixed with the gas targeted for decomposition is desirably 5 ppm or more, and air seasoning may be carried out for 1 liter of a chlorine solution described below at a flow rate 10 to 300 ml for this purpose. In this case, chlorine from several tens ppm to 300 ppm is obtained. In addition, this solution is diluted by city water or the like, thereby making it possible to obtain chlorine at a desired concentration. In the case of long air seasoning, the concentration of chlorine to be generated is decreased, and a reagent such as hydrochloric acid, sodium chloride, or sodium hypochlorite is desirably added so that a desired concentration can be provided. This may be continuously carried out, and a vessel for preparing a reagent and a vessel for performing air seasoning may be separated from each other.

(Method for Producing a Gas Containing a Chlorine Gas—Air Seasoning of Electrolytic Water)

Figure 3:
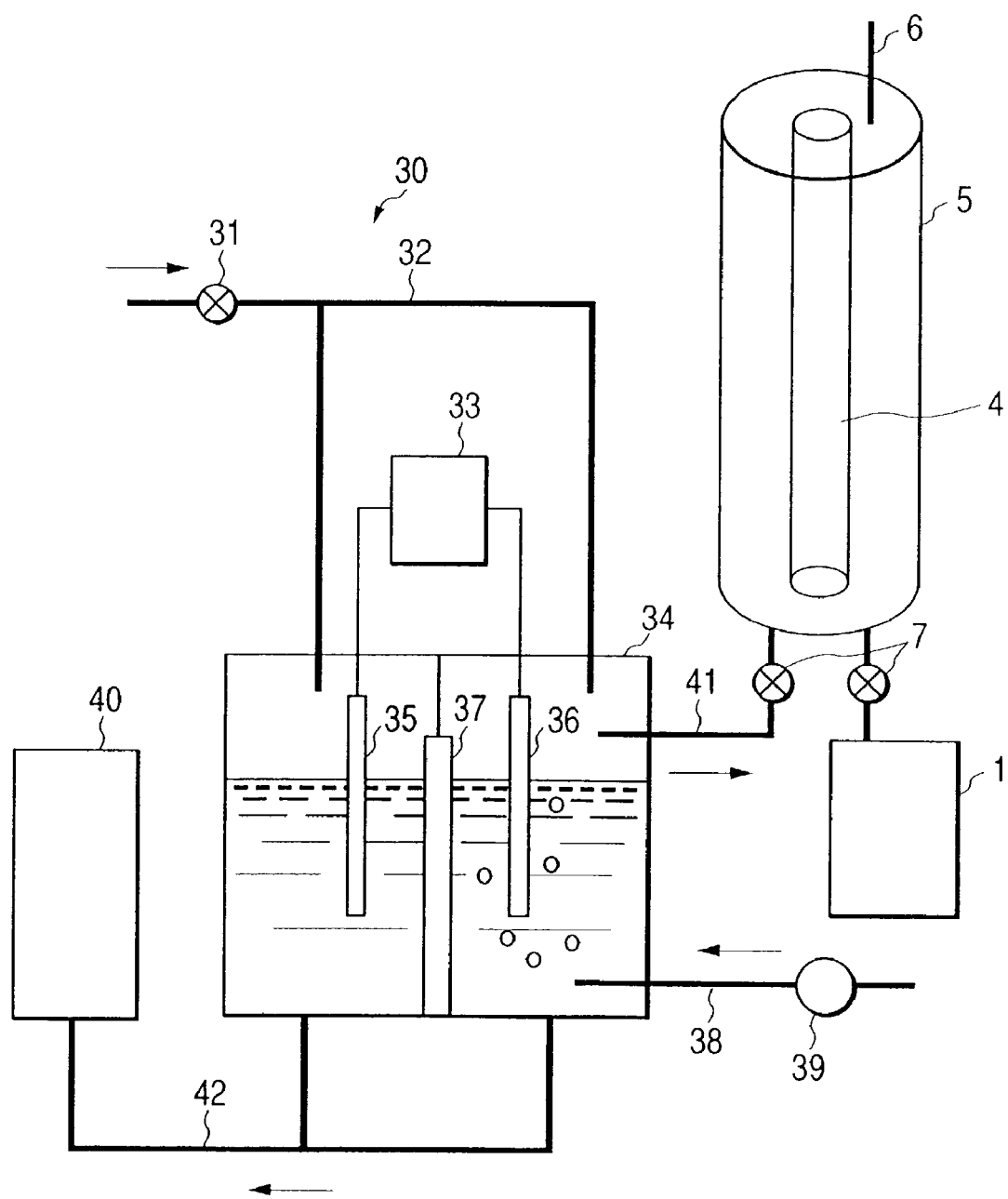
FIG. 3 is a schematic view of an apparatus for decomposing a gaseous aliphatic hydrocarbon halide compound according to another embodiment of the present invention.

A pair of electrodes is placed in water containing an electrolyte, and a potential is applied therebetween, thereby making it possible to produce a solution indicative of the above properties in the vicinity of an anode. For example, FIG. 3 is a schematic view showing an apparatus arrangement in which air is ventilated in a solution produced in the anode by water electrolysis, thereby producing a gas containing a chlorine gas, and the gas is introduced into the reaction vessel 5, thereby decomposing a gaseous aliphatic hydrocarbon halide compound. In the figure, reference numeral 30 denotes means for producing a gas containing a chlorine gas; and reference numeral 34 denotes a water vessel. The water vessel 34 comprises a cathode 35 and an anode 36; a diaphragm 37 such as ion exchange membrane, a power source 33 connected to the electrode; a pipe 32 and a pump 31 for supplying water containing an electrolyte in the water vessel; and a pipe 38 and a pump 39 for supplying a gas used for air ventilation in the water vessel; and a functional water whose residual chlorine concentration is lowered in the water vessel 34 by air ventilation and an alkaline water generated on the cathode side are stored in a tank 40. A water having an electrolyte dissolved in the water vessel 34 is supplied through the pipe 32, and the water vessel 34 is filled with the electrolyte dissolved water. When power is supplied from the power source 33 to electrodes 35 and 36 adopted for electrolysis, acid electrolytic water is generated on the anode 36 side. When a ventilation gas is continuously supplied from the pipe 38 to the anode 36 side of the water vessel 34 at a desired flow rate, a chlorine-containing gas is exhausted from an exhaust pipe 41. This chlorine-containing gas is introduced into the reaction vessel 5. On the other hand, a gas containing an organic chlorine compound is fed from a tank 1 for storing gas targeted for decomposition to the reaction vessel 5. A gas mixed in the reaction vessel causes decomposition reaction when light of a black light fluorescent lamp 4 is emitted. The gas is then exhausted from an exhaust pipe 6 connected to the reaction vessel 5.

The functional water whose residual chlorine concentration is lowered in air ventilation and an alkaline water generated on the cathode side are exhausted from the water vessel 34 to the tank 40 through an exhaust pipe 42. The exhausted water into the tank 40 may be arranged so as to dissolve an electrolyte again, and to be supplied to the water vessel 34.

As a diaphragm, there is preferably employed an ion exchange membrane that permits irreversible movement of a positive ion (for example, $Na^+$, $Ca^{2+}$, $Mg^{2+}$, $K^+$ or the like) existing on an anode side to a cathode side without moving the electrolytic water solution on the cathode 35 and anode 37 sides to each opposite side, and permits irreversible movement of a negative ion (for example, $Cl^-$, $SO_4^{2-}$, $HCO_{3-}$ or the like) existing in a cathode side to an anode side. That is, the ion exchange membrane is employed, thereby making it possible to efficiently generate a functional water having its properties as described later in the vicinity of the anode side.

With respect to the gas containing a chlorine gas, there has been described about air containing a chlorine gas, as a mere one example, obtainable by the step of aerating a solution containing chlorine with air, but air containing a chlorine gas naturally vaporized from a solution containing chlorine without aeration may be employed.

Figure 4:
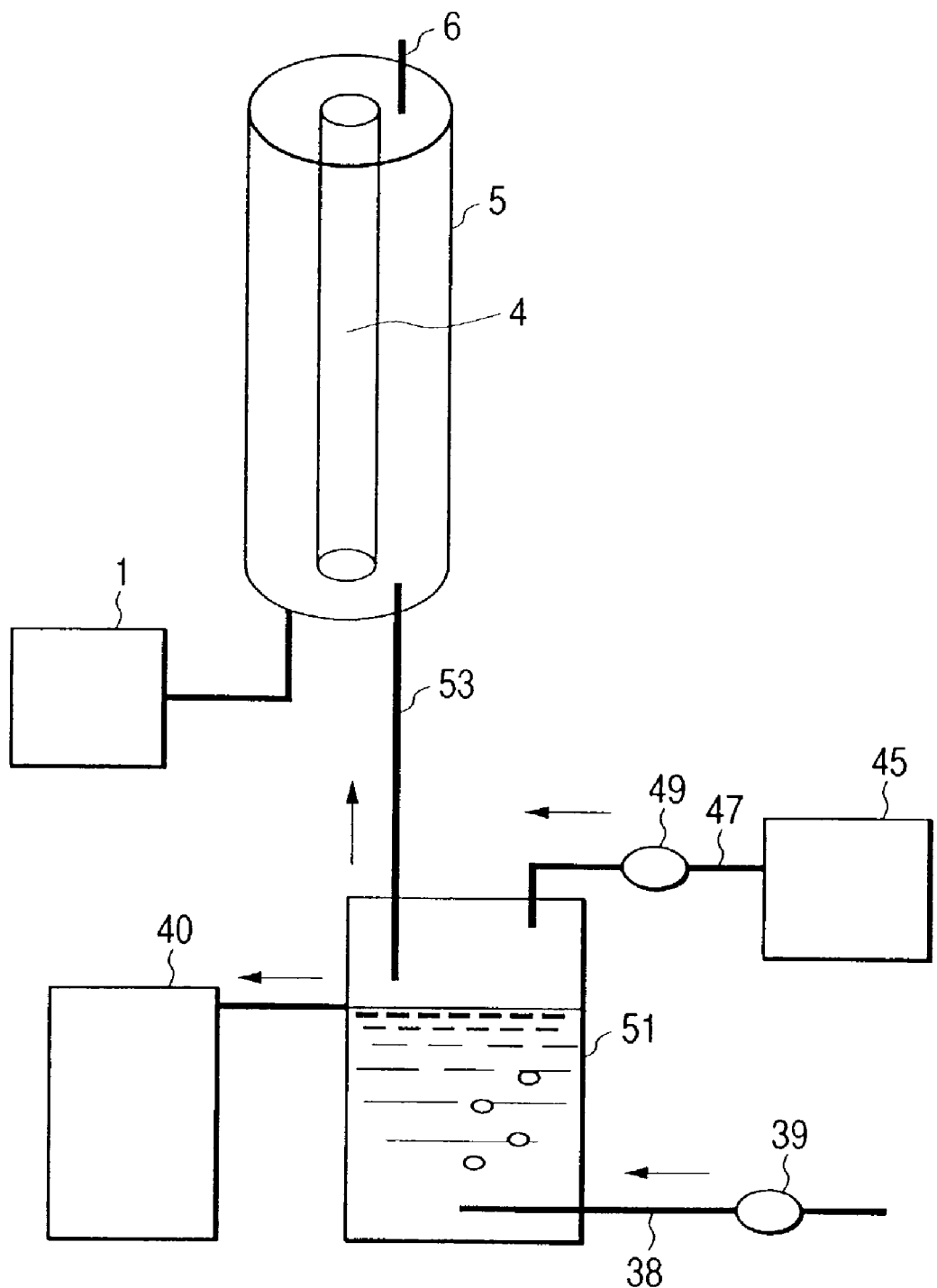
FIG. 4 is a schematic view of an apparatus for decomposing a gaseous aliphatic hydrocarbon halide compound according to another embodiment of the present invention.

FIG. 4 is a schematic view showing an apparatus for decomposing an organic compound according to another embodiment. In the figure, reference numeral 45 denotes an apparatus for generating functional water as denoted by 30 shown in FIG. 3 (a detailed arrangement is not shown); in which functional water formed on the anode side of the water vessel of the functional-water generating apparatus is continuously supplied to a chlorine gas-containing gas generating vessel 51 via a pump 49 and a pipe 47 at a desired flow rate. A ventilation gas is continuously supplied to the chlorine gas-containing gas generating vessel 51 via the supply pipe 38 and the pump 39 at a desired rate. As a result, the gas containing the chlorine gas is exhausted from an exhaust pipe 53. This chlorine-containing gas is introduced into the reaction vessel 5, and then, a compound targeted for decomposition is decomposed by the above mentioned method. In addition, the functional water employed for generating the chlorine gas-containing gas is exhausted from the chlorine gas-containing gas generating vessel 51 into the tank 40. Although it is not shown, part or all of the functional water exhausted into the tank 40 is supplied to a functional-water generating apparatus 45, and the supplied water may be reused for generating a new functional water. Thus, a method for generating air containing a chlorine gas through air in a chlorine solution is capable of supplying chlorine safely, simply, and constantly without requiring preparation of a chlorine cylinder or the like.

Figure 5:
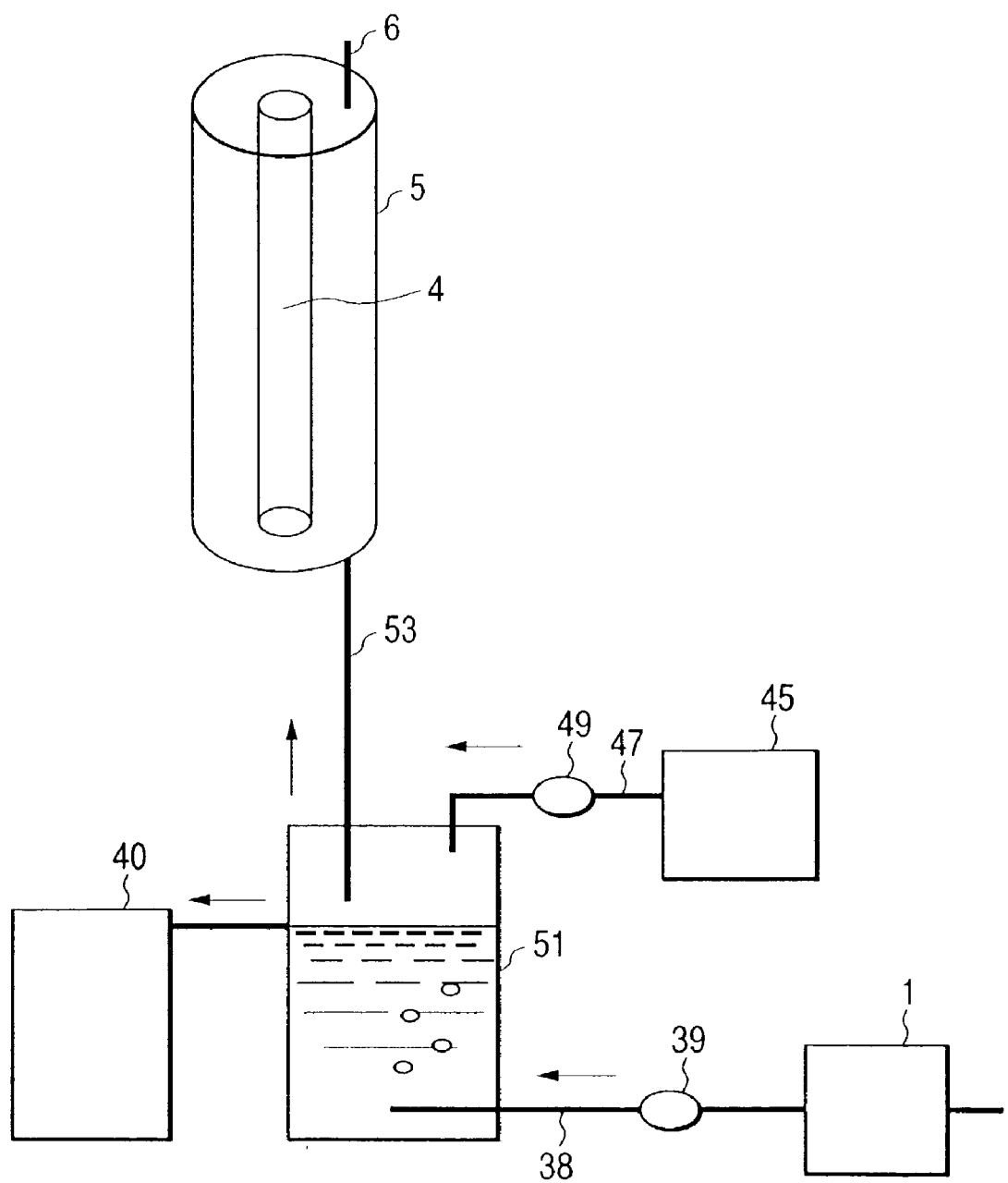
FIG. 5 is a schematic view of an apparatus for decomposing a gaseous aliphatic hydrocarbon halide compound according to another embodiment of the present invention.

FIG. 5 is a schematic view showing an apparatus for decomposing an organic compound. In order to obtain a chlorine gas employed for decomposition, air ventilation is carried out for a solution containing chlorine. In this embodiment, air containing a contamination gas is ventilated to a solution containing chlorine, thereby generating air containing chlorine gas and contamination gas targeted for decomposition.

Figure 6:
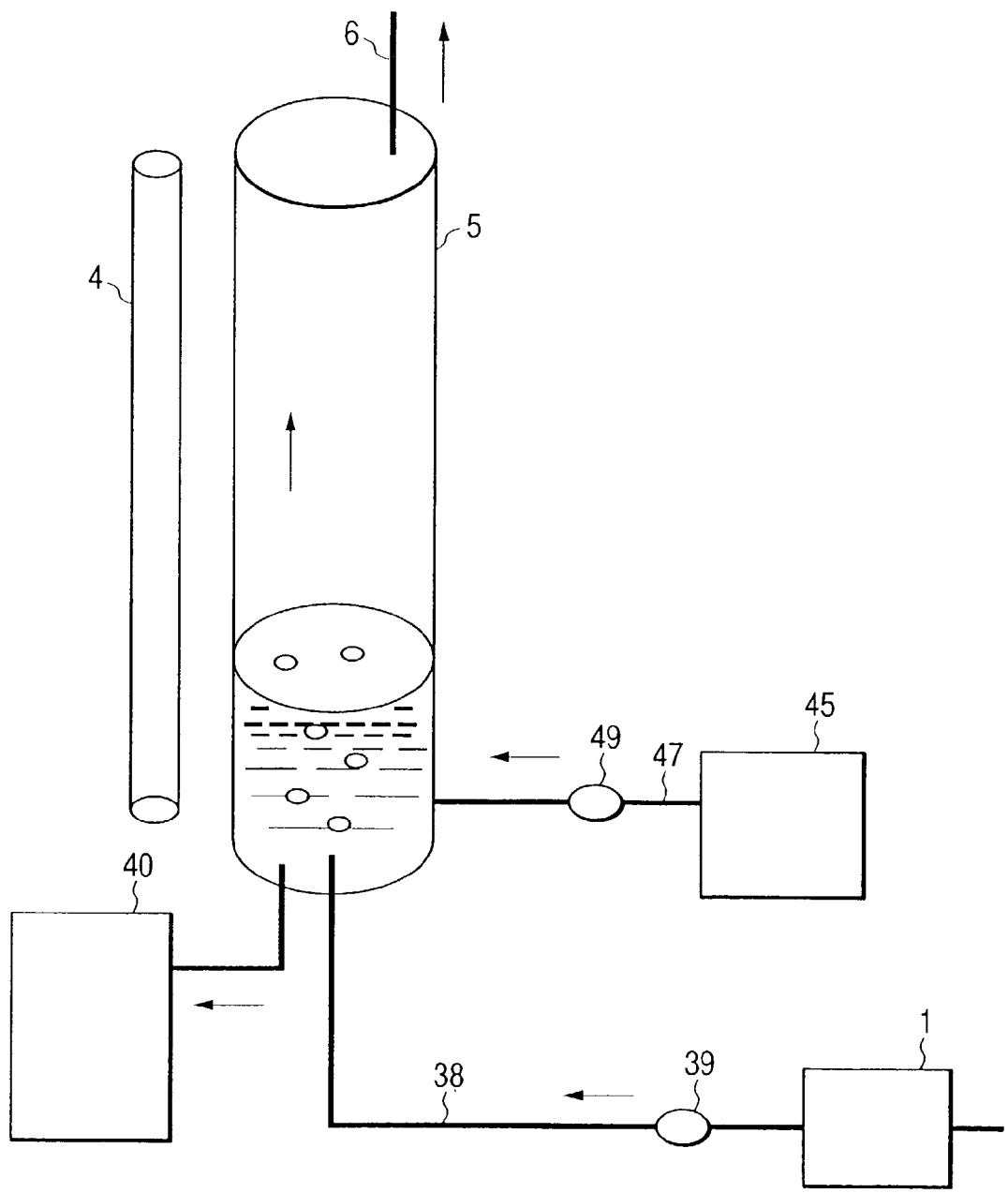
FIG. 6 is a schematic view of an apparatus for decomposing a gaseous aliphatic hydrocarbon halide compound according to a further embodiment of the present invention.

That is, reference numeral 45 shown in FIG. 5 denotes a water vessel storing a chlorine solution or a functional-water generating apparatus designated by reference numeral 30 shown in FIG. 3, wherein the chlorine solution or the functional water formed on the anode side of the water vessel of the functional-water generating apparatus are continuously supplied to a chlorine gas-containing gas generating vessel 51 at a desired flow rate by a pipe 47 and a pump 49. The gas to be ventilated in the generating vessel 51 is continuously supplied from a tank 1 for storing the contaminated gas to the generating vessel 51 at a desired flow rate via a supply pipe 38 and a pump 39. As a result, a gas containing a chlorine gas is exhausted from an exhaust pipe 53, and the gas containing chlorine is introduced into the reaction vessel 5 in a state in which the gas has already contained the gas targeted for decomposition. Thereafter, a compound targeted for decomposition is decomposed in the reaction vessel 5 in a manner similar to that in the above method. In addition, in order to produce a gas containing a chlorine gas, the functional water or the like introduced into the chlorine gas-containing gas generating vessel 51 is exhausted from the chlorine gas-containing gas generating vessel 51 to the tank 40. Further, although it is not shown, part or all of the functional water or the like that has been exhausted into the tank 40 may be reused for producing a new functional water by feeding it to a functional-water generating apparatus 45. Thus, a method for producing the air containing a chlorine gas and a contamination gas in a chlorine solution through the contamination air makes it possible to provide a simpler structure. FIG. 6 shows an example when the reaction vessel 5 and the chlorine gas-containing gas generating vessel 51 shown in FIG. 5 are integrated with each other, and the exhaust pipe 53 is removed. In this embodiment, a simpler structure can be achieved.

(Light and Light Emitting Conditions)

As light to be emitted to a mixture gas of a gas targeted for decomposition and a gas containing a chlorine gas, the light of 300 to 500 nm in wavelength, and in particular, 350 to 450 nm in wavelength is particularly preferable in decomposition efficiency. In addition, it is preferable from the viewpoint of decomposition efficiency that light emitting intensity is within a range from 10 $\mu W/cm^2$ to 10 $mW/cm^2$, and in particular, is within a range from 50 $\mu W/cm^2$ to 5 $mW/cm^2$. For example, in a light source having a peak at a wavelength 365 nm, practically sufficient decomposition advances at an intensity of several hundreds of $\mu W/cm^2$ (measured between 300 nm and 400 nm). As a light source of such light, natural light (for example, sunlight or the like) or artificial light (mercury lamp, black light, color fluorescent lamp (blue) or the like) may be employed.

Light may be emitted directly from the inside of the reaction vessel to a mixture gas of ethylene chloride and chlorine or may be emitted from the outside via the reaction vessel container. Any shape of the reaction vessel may be employed, for example, there may be employed the shape of a reaction vessel in which the periphery of a cylindrical light source is spirally covered with a transparent tube such as glass tube, the inside of which a mixture gas of the gas targeted for decomposition and chlorine passes through. In the present embodiment using chlorine, there is no need for employing ultraviolet rays of nearly 250 nm or less in wavelength that greatly affect a human body, thus making it possible to use a reaction vessel made of glass or plastics or the like.

In addition, in a wavelength region (100 to 280 nm) of emitted light belonging to so-called UV-C in which decomposition of an organic chlorine compound due to light emission is conventionally known also, decomposition is promoted by adding chlorine as described above.

In a site where at least one of soil and groundwater contaminated with an aliphatic hydrocarbon halide compound is purified, the contaminants are recollected by extracting from the soil or the water or by pumping out the contaminated water and aerating the water. Thus, it is very easy to combine such purifying system and a photo-decomposition system through addition of chlorine.

A contact between chlorine and a gaseous aliphatic hydrocarbon halide compound may be achieved under a normal temperature and pressure without requiring specific facilities or environment. Chlorine and gaseous aliphatic hydrocarbon halide compound may be merely ventilated under light emission.

(Post-treatment of Decomposed Gas)

Hereinafter, another embodiment of a method for decomposing a gaseous aliphatic hydrocarbon halide compound according to the present invention will be described with reference to FIG. 8.

Figure 8:
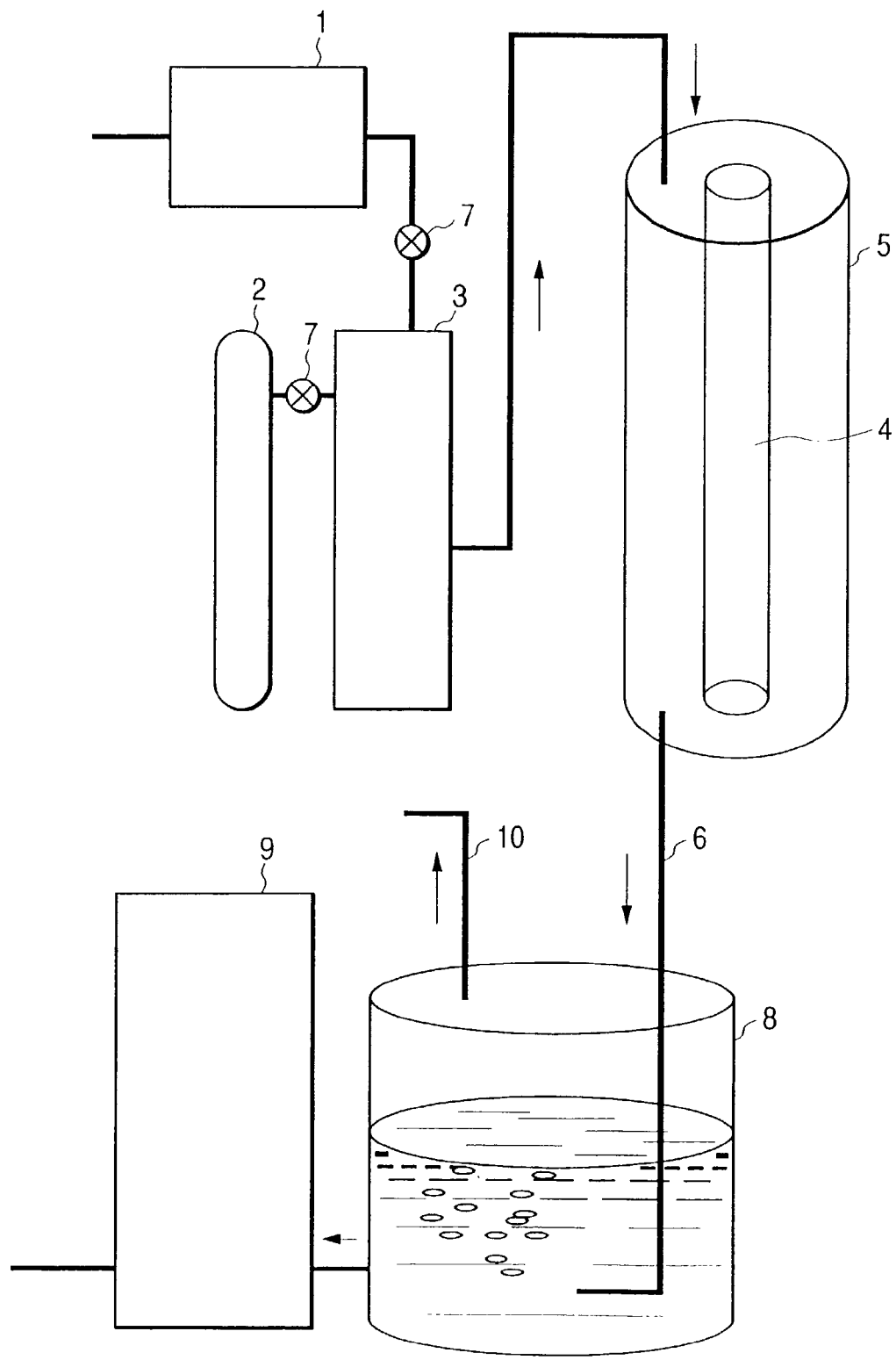
FIG. 8 shows an apparatus for decomposing a gaseous aliphatic hydrocarbon halide compound according to another embodiment of the present invention.

The apparatus shown in FIG. 8 is different from that shown in FIG. 1 to FIG. 6 in that it comprises means for removing a decomposition product or residual chlorine gas contained in a gas after a gaseous aliphatic hydrocarbon halide compound to be decomposed with a chlorine gas has reacted under light emission in the reaction vessel 5, and further, decomposing it. Specifically, the gas exhausted from the reaction vessel 5 through the exhaust pipe 6 is introduced into a treatment tank 8. The treatment tank 8 contains a liquid which reacts with the decomposition products or chlorine gas in the gas, or a liquid which dissolves the decomposition products or chlorine gas in the gas. The liquid in the treatment tank 8 is aerated with the gas exhausted from the reaction vessel 5. In case that the gaseous compound to be decomposed is trichloroethylene, as a by-product or decomposition product such as dichloroacetyl chloride, dichloroacetic acid etc. are produced and the exhaust from the reaction vessel 5 may contain these decomposition products. Further, the exhaust may contain an unreacted chlorine gas. The exhaust in which at least one of the decomposition product(s) and the unreacted chlorine gas is contained is purified by aerating water with the exhaust since almost all the dichloroacetyl chloride, dichloroacetic acid and a chloride gas in the exhaust are dissolved in the water. By applying such a treatment to the exhaust, it is purified such that it can be discharged to environment. In addition, as a liquid to be contained in the treatment tank, alkaline water solution, for example, water solution of sodium hydroxide or calcium carbonate or the like as well as water can be preferably employed. Alternatively, alkaline water produced by electrolysis of water containing electrolyte, for example, (hereinafter, simply referred to as alkaline water) may be employed as a trap of the reacted product or chlorine gas in the air exhaust. In particular, when air seasoning of an electrolytic water is employed as a manufacturing process of gas containing chlorine gas, alkaline water itself is generated. Utilizing this alkaline water in post-treatment process can be a particularly preferred embodiment from the viewpoint of efficient use of resources.

Further, the liquid in the treatment tank 8 in which these decomposition product and chlorine gas are treated is introduced into a microorganism vessel 9 where the decomposition product may be decomposed in contact with microorganisms having capable of decomposing halo acid, for example. The decomposition product is almost or totally decomposed through this process, and thus, the decomposing apparatus and method according to the present invention is environment-friendly, and is superior to any other one.

Although any or all of the microorganisms may be employed as far as they decompose a decomposition product, active sludge or soil microorganisms can be utilized. In the case where a decomposition product is a halo acid, for example, dichloro acetic acid, the product is known to be decomposed in an ordinary active-sludge vessel. In the case where treatment water contains a dichloro acetic acid, the treatment water is introduced into the active-sludge vessel, making it possible to provide a process for treating microorganisms of the treatment water. In addition, the inventors verified that trichloro acetic acid could be decomposed when treatment water containing trichloro acetic acid being a decomposition product is introduced in the active-sludge vessel. As described above, dichloro acetic acid is known to be easily decomposed by aerobic microorganisms. As an example of microorganisms isolated and identified, Xanthobactor autotorophicus GJ10 or the like disclosed by Heinz, U and Rehm, H-J et al. in Applied Microbiology and Biotechnology, Vol. 40, pages 158 to 164 can be utilized in this process. Canon found out *Renobactor* sp. Strain AC FERM BP-5353 as a microorganism having a capability of decomposing halo acid such as dichloro acetic acid or trichloro acetic acid extremely efficiently, a detailed description of which was disclosed in Japanese Patent Application Laid-Open No. 8-140665. This microorganism is one of the microorganisms that can be very preferably employed in this process. Micrological properties of FERM BP-5353 are shown below according to an identification criterion: Bergey's Manual (1984).

A. Morphological properties
   Gram dyeing: Negative
   Cell size and shape: C-shaped and/or S-shaped *Bacillus* in 1.0 to 2.0 μm in length and 0.2 to 0.5 μm in width
   Maneuverability: None
   Color of colony: White to ivory B. Growth state in various culture mediums
   BHIA: Good in growth
   MacConkey: Defective in growth C. Proper temperature up to growth: 25 to 35° C.

D. Physiological properties
   Discrimination between "aerobic" and "anaerobic": Aerobic
   TSI (slant/butt): Alkali/alkali, H2 S (−)
   Oxydase: Positive
   Catalase: Positive As has been described above, according to various embodiments of the present invention, a chlorine gas and a gaseous aliphatic hydrocarbon halide compound can be decomposed in contact with each other under a normal temperature, a normal pressure, and light emission; and substances causing environmental contamination can be efficiently decomposed without requiring specific facilities or the like.

Water or the like is aerated by employing a gas obtained through a decomposing process, thereby making it possible to almost remove a decomposition product or an unreacted chlorine gas or the like that may be contained in the gas from the gas, and bringing about a particularly superior effect in environmental purification. Further, when the aerated water or the like contains the decomposition product, the water is brought into contact with microorganisms or introduced into active sludge vessel, whereby the decomposition product can be made almost totally harmless, an aliphatic hydrocarbon halide compound can be decomposed more significantly, and environment can be purified more significantly.

Hereinafter, the present invention will be described in detail by way of Embodiment s without being limited thereto.

(Embodiment 1)

Photolysis Decomposition of Trichloroethylene (TCE) Due to Addition of Chlorine

A plurality of glass vial bottle of 27.5 ml in capacitance were provided, and each glass vial bottle was sealed using a butyl rubber cap lined with Teflon and an aluminum seal. Next, a TCE gas was added through a butyl rubber plug by a gas tight syringe so that the TCE gas concentration in each glass vial bottle becomes 250 ppm. Further, a chlorine gas was added through the butyl rubber plug by a gas tight syringe so that the chlorine gas concentration in each glass vial bottle becomes 100 ppm, and then, the emissions of light of a black light fluorescent lamp (brand name: FL10BLB; available from Toshiba Corporation, 10W) at an emission intensity of 200 $\mu W/cm^2$ were defined as sample group A. The light emission intensity was measured by a digital ultraviolet-ray intensity meter (Lutron, UVA-365). Samples in which no light was emitted as a control experiment were defined as sample group B; the emissions of the same light without adding chlorine was defined as sample group C; and samples in which no chlorine was added, and no light emission was carried out were defined as sample group D. A change with an elapse of time for the TCE concentration of sample groups A to D was measured. A gas phase of a glass vial bottle was sampled by a gas tight syringe, and then, the TCE concentration was measured using a gas chromatography (GC-14B with FID detector available from Shimadzu Corporation. As a column, DB-624 available from J & W was used.). As a result, sample group A was decomposed by 99.8% 5 minutes after light emission had been started, and was below a detectable limit after 10 minutes. At this time, in the gas chromatography, a peak of tetrachloroethylene (PCE) was not monitored, and it was observed that TCE is not converted into PCE. On the other hand, in sample group B, no decomposition of TCE was observed. Thereafter, although the TCE concentration was measured for a total 5 hours by one hour, no decomposition of TCE was observed during this period. In sample group C, an only decrease in TCE concentration of 9.7% was observed for 3 hours. In sample group D, no TCE decomposition was observed.

Hence, it was found that TCE can be decomposed by addition of a chlorine gas to a gas targeted for decomposition and light emission. In addition, it was verified that TCE can be decomposed for a different chlorine concentration and light intensity.

(Embodiment 2)

Photolysis of Tetrachloroethylene Due to Addition of Chlorine

PCE decomposition was evaluated in the same manner as that in Embodiment 1 except that a gas targeted for decomposition was replaced with tetrachloroethylene (PCE), and an initial concentration was changed. PCE was added to a glass vial bottle by a gas tight syringe so that an initial PCE concentration becomes 80 ppm; a chlorine gas was further added to the glass vial bottle by the gas tight syringe so that the chlorine gas concentration in the glass vial bottle becomes 100 ppm, and then, the light of black light lamp was emitted in the same manner as that in Embodiment 1. When the PCE concentration was obtained by gas chromatography after 5 minutes had been elapsed after black light emission, 99.8% was decomposed. After 10 minutes, the concentration was below the detectable limit. At this time, no TCE peak was observed.

In control experiment using only light, PCE decomposition was several percent for one hour, and it was verified that decomposition does not occur by mere addition of chlorine without light emission. That is, it was verified that decomposition occurs due to addition of chlorine under light emission. Further, when PCE decomposition was evaluated for conditions with different chlorine and PCE concentration, the concentration of PCE with an elapse of time was monitored to have been lowered, and photolysis of PCE due to addition of chlorine was verified.

(Embodiment 3)

Photolysis of Re-added Trichloroethylene Due to Addition of Chlorine and Light Emission A plurality of glass vial bottles of 27.5 ml in capacitance were provided, and were sealed by a butyl rubber plug lined with Teflon and an aluminum seal. Then, a chlorine gas was added to each glass vial bottle by a gas tight syringe through the butyl rubber plug so that the chlorine concentration in each glass vial bottle becomes 120 ppm, and a TCE gas of 250 ppm was further added to each glass vial bottle by the gas tight syringe through the butyl rubber plug. The light of a black light fluorescent lamp (brand name: FL10BLB; available from Toshiba Corporation, 10W) was emitted to these vial bottles for 30 minutes at an emission intensity of 200 $\mu W/cm^2$, and a change in TCE concentration with an elapse of time was observed. A gas phase of a glass vial bottle was sampled by a gas tight syringe, and then, the TCE concentration in the glass vial bottle was measured using gas chromatography (brand name: GC-14B FID with detector available from Shimadzu Corporation. As a column, a brand name DB-624 available from J & W was used.). The TCE concentration was below the detectable limit 30 minutes after light emission had been started. The TCE gas was added to this glass vial bottle through the butyl rubber plug by the gas tight syringe so that the TCE concentration becomes 250 ppm again, light emission was carried out, and the TCE concentration was measured 30 minutes after the light emission had been started. As a result, the concentration was below the detectable limit. A TCE gas was added again to this glass vial bottle by the gas tight syringe through the butyl rubber plug so that the TCE concentration becomes 250 ppm, and light emission was continuously performed. As a result, the TCE concentration was below the detectable limit again 30 minutes after the light emission had been started. Consequently, it was found that re-added trichloroethylene can be decomposed without adding chlorine again.

(Embodiment 4)

Photolysis of a Mixture of Trichloroethylene and Tetrachloroethylene Due to Addition of Chlorine A mixture gas of trichloroethylene and tetrachloroethylene was targeted for decomposition, and decomposition experiment was carried out in the same manner as that Embodiment 1 except that an initial concentration was set as follows: That is, a TCE gas was added by a gas tight syringe through a butyl rubber plug so that the TCE gas concentration in the glass vial bottle becomes 550 ppm, and the PCE gas concentration becomes 150 ppm. Further, a chlorine gas was added by a gas tight syringe through the butyl rubber plug so that the chlorine gas concentration in the glass vial bottle becomes 100 ppm, and then, was subjected to sun light and left for 0.5 hour. The light emission intensity was 0.2 to 0.7 mW/cm$^2$. Next, the PCE and TCE concentrations in the glass vial bottle were measured. A gas phase portion of the glass vial bottle was sampled by the gas tight syringe, and then, the TCE and PCE concentrations at the gas phase portion in the glass vial bottle were measured using gas chromatography (GC-14B with FID detector available from Shimadzu Corporation. As a column, DB-624 available from J & W was used.)

The results were below the detectable limit for TCE and PCE.

(Embodiment 5)

Wavelength of Light Which Affects Photolysis of Trichloroethylene

First, a plurality of glass vial bottles of 27 ml in capacitance were provided, and were sealed with a butyl rubber plug lined with Teflon and an aluminum seal. A TCE gas was added to all glass vial bottles by a gas tight syringe through a butyl rubber plug so that the TCE gas concentration in the glass vial bottle becomes 300 ppm, and the chlorine concentration becomes 50 ppm. Next, the glass vial bottles each was covered with various filters-having their filtering properties of 280 nm, 370 nm, 440 nm, or 540 nm (brand name: UTF-50S-28U, SCF-50-37L, SCF-50-44L, and SCF-50-54; available from Siguma Optics and Machinery Co., Ltd), and then, these vial bottles were subjected to direct sun light. The glass vial bottles do not transmit light of 300 nm or less. After 15 minutes, a gas phase portion of the glass vial bottle was sampled by the gas tight syringe, and then the TCE concentration of the gas phase portion in the glass vial bottle was measured using gas chromatography (GC-14B with FID detector available from Shimadzu Corporation. As a column, DB-624 available from J & W was used.). The result is shown in Table 1 below.

TABLE 1

| Wavelength area (nm) | Decomposition rate (%) |
|---|---|
| 280–370 | 97.5 |
| 370–440 | 99.2 |
| 440–540 | 15.7 |
| 540– | 5.3 |

As evident from the foregoing result, it was found to be effective when the wavelength of light to be emitted is 300 to 550 nm, and in particular, 350 to 450 nm.

(Embodiment 6)

Effect of Chlorine Concentration upon Photolysis of Trichloroethylene

A plurality of glass vial bottles of 27.5 ml in capacitance were provided, and were sealed with a butyl rubber plug lined with Teflon and an aluminum seal. Next, a TCE gas was added to each glass vial bottle by a gas tight syringe through the butyl rubber plug so that the TCE gas concentration in the glass vial bottle becomes 276 ppm. Then, a chlorine gas was added by the gas tight syringe through the butyl rubber plug so that the chlorine gas concentration in each glass vial bottle becomes 8, 15, 30, 70, or 120 ppm. For control, samples in which no chlorine was added (chlorine concentration: 0 ppm) were provided. The light of a black light fluorescent lamp (brand name: FL10BLB; available from Toshiba Corporation, 10 W) was emitted to these vial bottles using an emission intensity of 200 to 300 µW/cm$^2$. The gas phase of each glass vial bottle was sampled by the gas tight syringe 2.5 minutes, 5 minutes, and 45 minutes after the light emission had been started; and the residual TCE concentration was measured by gas chromatography (GC-14B with FID detector available from Shimadzu Corporation. As a column, DB-624 available from J & W was used.). The result is shown in Table 2 below.

TABLE 2

| Chlorine concentration (ppm) | Emission time | | |
|---|---|---|---|
| | 2.5 minutes | 5 minutes | 45 minutes |
| 0 | 276 ppm | 274 ppm | 276 ppm |
| 8 | 266 | 263 | 250 |
| 15 | 248 | 202 | 180 |
| 30 | 200 | 144 | 129 |
| 70 | ND* | 0.8 | NPD* |
| 120 | 0.3 | NPD | — |

*ND: No data, NPD: Below detectable limit (Embodiment 7)

Photolysis of a Mixture of Trichloroethylene and Tetrachloroethylene Due to Addition of Chlorine A glass vial bottle of 27.5 ml in capacitance was sealed with a butyl rubber plug lined with Teflon and an aluminum seal. Next, a TCE gas was added by a gas tight syringe through the butyl rubber plug so that the TCE gas concentration in the glass vial bottle becomes 2760 ppm and the PCE gas concentration becomes 680 ppm. Further, a chlorine gas was added by the gas tight syringe through the butyl rubber plug so that the chlorine gas concentration in the glass vial bottle becomes 250 ppm, and then, the light of a black light fluorescent lamp (brand name: FL10BLB; available from Toshiba Corporation, 10 W) was emitted at an emission intensity of 200 to 300 µW/cm$^2$ for 15 minutes. A gas phase portion of the glass vial bottle were sampled by a gas tight syringe, and then, the TCE and PCE concentrations of the gas phase portion in the glass vial bottle were measured using gas chromatography (GC-14B with FID detector available from Shimadzu Corporation. As a column, the DB-624 available from J & W was used.).

After 15-minute light emission, when the TCE and PCE concentrations were measured, the TCE concentration was 0.17 ppm, and the PCE was below the detectable limit.

(Embodiment 8)

Photolysis of Dichloromethane Due to Addition of Chlorine

A compound targeted for decomposition was replaced with dichloromethane, and sample group A in which the light of a black light fluorescent lamp (brand name: FL10BLB; available from Toshiba Corporation, 10 W) was emitted at an emission intensity of 200 µW/cm$^2$ was provided in the same manner as that in Embodiment 1 except that an initial concentration was set to 1700 ppm. There were defined sample group B in which no light was emitted as a control experiment; sample group C in which chlorine was not added, but light was emitted; sample group D in which no chlorine was added, and no light was emitted; and sample group E in which light was emitted using a low insect enticement fluorescent lamp having cut a wavelength of 450 nm or less (brand name: FLR40S-Y-NU/M; available from Toshiba Corporation, 40 W) in place of emission of the black light fluorescent lamp in sample group A. Gas phases of the glass vial bottles of the sample groups A to E were sampled by a gas tight syringe, and a concentration of dichloromethane gas was measured by a gas chromatography (GC-14B with FID detector available from Shimadzu Corporation. As a column, DB-624 available from J & W was used.). As a result, sample group A was decomposed by 99.8% 7 minutes after light emission had been started, and was below a detectable limit after 10 minutes. At this time, a peak of trichloromethane and tetrachloromethane was not monitored, and there was no conversion to trichloromethane and tetrachloromethane. On the other hand, no decomposition was observed in sample group B. Thereafter, measurement was carried out for 5 hours by one hour each, but no decomposition was observed during this period. In addition, in sample group C in which only light was emitted, a decrease of 7.7% in dichloromethane concentration was observed in 3 hours. In sample group E also, some % of decrease was observed. In addition, in sample group D, no decomposition was observed.

Consequently, it was found that dichloromethane can be completely decomposed by addition of chlorine and light emission. In addition, it was verified that dichloromethane can be decomposed for a different chlorine concentration and light intensity.

(Embodiment 9)

Photolysis of Trichloromethane (Chloroform) Due to Addition of Chlorine

A compound targeted for decomposition was replaced with trichloromethane (chloroform), and decomposition experiment was carried out in the same manner as that in Embodiment 8 except that an initial concentration was set to 800 ppm. When a chloroform concentration was obtained by gas chromatography 5 minutes after light emission, the concentration was below a detectable limit after 15 minutes. At this time, no other chloride methane peak was observed.

In a control experiment using only light, decomposition of chloroform was some % for one hour, and it was verified that decomposition does not occur only due to addition of chlorine without emitting light. That is, it was verified that decomposition occurs due to addition of chlorine under light emission. Further, when decomposition was evaluated for a condition in which the chlorine concentration and chloroform concentration were different from each other, all of the concentrations was monitored to have been lowered with an elapse of time, and photolysis of chloroform due to addition of chlorine was verified.

(Embodiment 10)

Photolysis of Re-added Dichloromethane Due to Addition of Chlorine and Light Emission A glass vial bottle of 27.5 ml in capacitance was sealed with butyl rubber plug lined by Teflon and an aluminum seal, and then, a chlorine gas was added into a glass vial bottle by a gas tight syringe through the butyl rubber plug so that the chlorine concentration in the glass vial bottle becomes 120 ppm, and further, a dichloromethane gas of 1000 ppm was added into the glass vial bottle by a gas tight syringe through the butyl rubber plug. The light of the black light fluorescent lamp (brand name: FL10BLB; available from Toshiba Corporation, 10 W) was emitted to the vial bottle at an emission intensity of 200 $\mu W/cm^2$ for 30 minutes.

A gas phase of a glass vial bottle was sampled by a gas tight syringe, and the concentration of dichloromethane in the glass vial bottle was measured by gas chromatography (brand name: GC-14B (with FID detector); available from Shimadzu Corporation. As a column, brand name DB-624 available from J & W was used.). 30 minutes after light emission had been started, the dichloromethane concentration was below a detectable limit. A dichloromethane gas was further added again to a glass vial bottle by a gas tight syringe through the butyl rubber plug so that the dichloromethane concentration is 100 ppm, and light emission was continuously performed again. 30 minutes after light emission had been started, the dichloromethane concentration was below a detectable limit again, A dichloromethane gas was further added again to a glass vial bottle by a gas tight syringe through the butyl rubber plug so that the dichloromethane concentration is 1000 ppm, and light emission was continuously performed again. After 30 minutes, the dichloromethane concentration was below the detectable limit. Thus, it was found that the re-added dichloromethane is well decomposed without re-adding chlorine.

(Embodiment 11)

Photolysis of a Mixture of Dichloromethane and Trichloromethane Due to Addition of Chlorine A glass vial bottle of 27.5 ml in capacitance was sealed with a butyl rubber plug with Teflon liner and an aluminum seal. Next, a chloroform gas was added by a gas tight syringe through the butyl rubber plug so that the dichloromethane gas in the glass vial bottle is 2000 ppm and the chloroform gas is 3000 ppm. Further, a chlorine gas was added by the gas tight syringe through the butyl rubber plug so that the chlorine gas concentration in the glass vial bottle is 200 ppm, and then, the light of the black light fluorescent lamp (brand name: FL10BLB; available from Toshiba Corporation, 10 W) was emitted at an emission intensity of 200 to 300 $\mu W/cm^2$ for 40 minutes. The gas in the gas vial bottle was sampled by the gas tight syringe, and the concentration of dichloromethane and chloroform in the glass vial bottle was measured by gas chromatography (GC-14B with FID detector available from Shimadzu Corporation. As a column, DB-624 available from J & W was used.).

After 40-minute light emission, when the concentrations of dichloromethane and chloroform were measured, both of them were below the detectable limit.

(Embodiment 12)

Photolysis of cis-1,2-dichloroethylene Due to Addition of Chlorine

Sample groups A to E were provided in the same manner as that in Embodiment 8 except that a compound targeted for decomposition was replaced with cis-1,2-dichloroethylene, and decomposition experiment of cis-1,2-dichloroethylene was carried out. As a result, sample group A was decomposed by 99.8% 7 minutes after light emission had been started, and was below a detectable limit after 10 minutes. At this time, a peak of trichloroethylene and tetrachloroethylene was not monitored, and there was no conversion to trichloroethylene and tetrachloroethylene. On the other hand, no decomposition was verified in sample group B. Thereafter, measurement was carried out for 5 hours by one hour each, but no decomposition was verified during this period. In sample group C, a decrease of 7.7% in cis-1,2-dichloroethylene concentration was observed for 3 hours. Also in sample group E, some % of decrease was observed. In addition, in sample group D, no decomposition was observed. In this manner, it was found that cis-1,2-dichloroethylene can be completely decomposed by addition of chlorine gas and light emission. In addition, it was verified that cis-1,2-dichloroethylene can be decomposed for a different chlorine concentration and light intensity.

(Embodiment 13)

Photolysis of 1,1-dichloroethylene Due to Addition of Chlorine

In the same manner as that in Embodiment 12, decomposition of 1,1-dichloroethylene was evaluated. 1,1-dichloroethylene was added into a glass vial bottle by a gas tight syringe so that an initial 1,1-dichloroethylene concentration is 800 ppm. Further, chlorine was added into the glass vial bottle by the gas tight syringe so that the chlorine gas concentration in the glass vial bottle is 100 ppm, and then, a black light beam was emitted in the same manner as that in Embodiment 12. When the 1,1-dichloroethylene concentration was obtained by gas chromatography 5 minutes after light emission, the concentration was below a detectable limit after 15 minutes. In addition, at this time, no other peak of dichloroethylene was observed.

In a control experiment using only light, decomposition of 1,1-dichloroethylene was several percent for one hour, and it was verified that decomposition does not occur due to addition of chlorine without emitting light. That is, it was verified that decomposition occurs due to addition of chlorine under light emission. Further, when decomposition was evaluated for conditions in which the chlorine concentration and 1,1-dichloroethylene concentration are different from each other, all of the concentrations were monitored to have been lowered with an elapse of time, and photolysis of 1,1-dichloroethylene dichloroethylene due to addition of chlorine was verified.

(Embodiment 14)

Photolysis of trans-1,2-dichloroethylene Due to Addition of Chroline

In the same manner as that in Embodiment 12, decomposition of trans-1,2-dichloroethylene was evaluated. Trans-1,2-dichloroethylene was added into a glass vial bottle by a gas tight syringe so that an initial trans-1,2-dichloroethylene concentration is 800 ppm, and further, chlorine was added into the glass vial bottle by the gas tight syringe so that the chlorine gas concentration in the glass vial bottle is 100 ppm. Thereafter, a black light beam was emitted in the same manner as that in Embodiment 12. When the trans-1,2-dichloroethylene concentration was obtained by gas chromatography 5 minutes after light emission, the concentration was below a detectable limit after 15 minutes. In addition, at this time, no other peak of dichloroethylene was observed.

In a control experiment using only light, decomposition of trans-1,2-dichloroethylene was several percent for one hour, and it was verified that decomposition does not occur due to addition of chlorine without emitting light. That is, it was verified that decomposition occurs due to addition of chlorine under light emission. Further, when decomposition was evaluated for a condition in which the chlorine concentration and trans-1,2-dichloroethylene concentration are different from each other, all of the concentrations were monitored to have been lowered with an elapse of time, and photolysis of trans-1,2-dichloroethylene due to addition of chlorine was verified.

(Embodiment 15)

Photolysis of Re-added cis-1,2-dichloroethylene Due to Addition of Chlorine and Light Emission A chlorine gas was sealed in a glass vial bottle of 27.5 ml in capacitance with a butyl rubber plug with Teflon liner and an aluminum seal, and then, the chlorine gas was added into the glass vial bottle by a gas tight syringe through the butyl rubber plug so that the chlorine concentration in the glass vial bottle is 120 ppm. Further, a cis-1,2-dichlorethylene gas of 1000 ppm was added into the glass vial bottle by the gas tight syringe through the butyl rubber plug. The light of a black light fluorescent lamp (brand name: FL10BLB; available from Toshiba Corporation, 10 W) was emitted to this vial bottle at an emission intensity of 200 $\mu W/cm^2$ for 30 minutes.

A gas phase of the glass vial bottle was sampled by the gas tight syringe, and the concentration of cis-1,2-dichloroethylene in the glass vial bottle was measured by gas chromatography (brand name: GC-14B with FID detector available from Shimadzu Corporation. As a column, the brand name DB-624 available from J & W was used.). 30 minutes after light emission had been started, the concentration of cis-1,2-dichloroethylene was below a detectable limit. A cis-1,2-dichloroethylene gas was added again into the glass vial bottle by gas tight syringe through the butyl rubber plug so that the cis-1,2-dichloroethylene concentration is 100 ppm again, and light emission was continuously performed. 30 minutes after light emission had been started, the cis-1,2-dichloroethylene concentration was below a detectable limit again. A cis-1,2-dichloroethylene gas was further added again into the glass vial bottle by the gas tight syringe through the butyl rubber plug so that the cis-1,2-dichloroethylene concentration is 1000 ppm, and light emission was continuously performed. After 30 minutes, the concentration of cis-1,2-dichloroethylene was below a detectable limit. Thus, it was found that the re-added cis-1,2-dichloroethylene is well decomposed without re-adding chlorine.

(Embodiment 16)

Photolysis of Ethylene Mixture of cis-1,2-dichloroethylene, trans-1,2-dichloroethylene, and 1,1-dichloroethylene Due to Addition of Chlorine A glass vial bottle of 27.5 ml in capacitance was sealed with a butyl rubber plug lined with Teflon and an aluminum seal. Next, ethylene gases were added by a gas tight syringe through a butyl rubber plug so that the concentrations of cis-1,2-dichloroethylene and trans-1,2-dichloroethylene gas in the glass vial bottle are 2000 ppm, and the concentration of 1,1-dichloroethylene gas is 3000 ppm. Further, a chlorine gas was added by a gas tight syringe through the butyl rubber plug so that the chlorine gas concentration in the glass vial bottle is 200 ppm, and then, the light of a black light fluorescent lamp (brand name: FL10BLB; available from Toshiba Corporation, 10 W) was emitted at an emission light quantity of 200 to 300 $\mu W/cm^2$ for 40 minutes. The gas in the glass vial bottle was sampled by the gas tight syringe, and the concentrations of cis-1,2-dichloroethylene, trans-1,2-dichloroethylene, and 1,1-dichloroethylene in the glass vial bottle were measured by gas chromatography (GC-14B with FID detector available from Shimadzu Corporation. As a column, DB-624 available from J & W was used.). After 40-minute light emission, when the concentrations of cis-1,2-dichloroethylene, trans-1,2-dichloroethylene, and 1,1-dichloroethylene were measured, all of them were below a detectable limit.

(Embodiment 17)

A decomposition experiment was carried out using a decomposing apparatus shown in FIG. 1.

Reference numeral 1 denotes an apparatus for supplying a gas targeted for decomposition; and reference numeral 2 denotes a chlorine cylinder. Chlorine is added to a contamination gas at a predetermined concentration by gas mixing means designated by reference numeral 3. The mixture gas having chlorine added therein is guided to a reaction vessel 5, and light is emitted to the mixture gas for a desired time period by light emitting means designated by reference numeral 4. The decomposed gas is exhausted from an exhaust pipe 6. The reaction vessel 5 has a capacitance of about 1200 ml, where a gas containing 700 ppm of trichloroethylene (TCE) was fed at 100 ml/min using a gas supplying apparatus 1 (standard gas generating apparatus, GasTech, PD-1B) gas mixing means 3. At the same time, a gas containing chlorine was fed to the reaction vessel 5 using the chlorine cylinder 2 and gas mixing means 3, and the chlorine concentration at an entrance of the reaction vessel 5 was set to 100–200 ppm. At this time, a very small amount of chlorine was added, and thus, a total flow rate of gas to be supplied to the reaction vessel 5 did not exceed 120 ml/min. The light of the black light fluorescent lamp 4 (brand name: FL10BLB; available from Toshiba Corporation, 10 W) was emitted from the inside of a reaction pipe. The light emission intensity was 0.3 to 0.5 mW/cm$^2$. When the TCE concentration of gas to be exhausted from the exhaust pipe 6 connected to the reaction pipe was measured by gas chromatography (GC-14B with FID detector available from Shimadzu Corporation. As a column, DB-624 available from J & W was used), 99.5% or more of the gas was found to have been decomposed. When decomposition was evaluated by causing operation at a different chlorine concentration and at a different flow rate, all of the concentrations were observed to have been lowered either. From the foregoing, it was found that TCE can be decomposed by mixing a gas containing chlorine and a TCE gas with each other using the above apparatus, and performing light emission. In addition, it was verified that TCE can be decomposed for a different light intensity.

(Embodiment 18)

A functional water was prepared using a strongly acidic functional-water generating apparatus (brand name: strong electrolytic water generator (Model FW-200); available from Amano Co., Ltd.). A diaphragm is arranged between an anode and a cathode. This apparatus is employed, and the electrolytic concentration and electrolyzing time of water to be electrolyzed was variously changed. The resultant pH of an acidic, functional water obtained on the anode side and an oxidation-reduction potential were measured by a pH meter (TCX-90i and KP900-2N available from Toko Chemicals Laboratory) and a conductivity meter (TCX-90i and KM900-2N available from Toko Chemicals Laboratory), and the chlorine concentration was measured by a chlorine test paper (AdvanTech). As a result, the pH of this functional water was changed to 1.0 to 4.0, the oxidation-reduction potential was changed to 800 to 1500 mV, and the chlorine concentration was changed to 5 to 150 mg/l depending on the concentration of electrolyzing sodium chloride (the standard concentration is 1000 mg/l); an electrolytic current value; and an electrolytic time. In this embodiment, operation was made under conditions in which the functional water of 2.1 in pH, 1150 mV in oxidization and reduction potential, and 64 mg/l in residual chlorine concentration. In operation, after air had been ventilated on an anode side as shown in FIG. 3, and the chlorine concentration of the gas from the anode side was measured by a gas-detector tube, the concentration was 100 to 200 ppm. The gas containing chlorine was introduced into the reaction pipe 5. The reaction pipe has a capacitance of 1200 ml, where a gas containing trichloroethylene (TCE) of 700 ppm was fed at 100 ml/min from tank 1 for storing gas targeted for decomposition (standard gas generating apparatus, GasTech, PD-1B). The light of a black light fluorescent lamp 4 (brand name: FL10BLB; available from Toshiba Corporation, 10 W) was emitted from the inside of the reaction pipe. The emission intensity was 0.3 to 0.5 mW/cm$^2$. The TCE concentration of gas to be exhausted from the exhaust pipe 6 connected to the reaction pipe was measured by gas chromatography (GC-14B with FID detector available from Shimadzu Corporation. As a column, DB-624 available from J & W was used.). As a result, 99.5% or more of the gas was found to have been decomposed. In addition, when the above apparatus was operated under conditions in which the pH and residual chlorine are different from any other, and decomposition was evaluated, all of the concentrations were observed to have been lowered. Consequently, it was found that the gas obtained by applying air ventilation and air seasoning to the functional water liquid using the above apparatus is mixed with the TCE gas, and light emission is performed, thereby making it possible to decompose TCE. In addition, it was verified that TCE can be decomposed for a different light intensity.

(Embodiment 19)

In a water solution in which pure water was prepared so that a hydrochloric acid is 0.001 to 0.1 N; sodium chloride is 0.005 to 0.02 N; and sodium hypochlorite is 0.0001 to 0.01 M, the pH, oxidation-reduction potential, and residual chlorine concentration were measured. As a result, the pH was changed to 1.0 to 4.0, the oxidization and reduction potential was 800 to 1500 mV, and the residual chlorine concentration was changed to 5 to 150 mg/l. Here, when hydrochloric acid was 0.006 N, sodium chloride was 0.014 N, and sodium hypochlorite was 0.002 M, the pH was 2.3, the oxidization and reduction potential was 1180 mV, and the residual chlorine concentration was 105 mg/l, and this solution was served to experiment. This solution was supplied to a water vessel 22 shown in FIG. 2, and a pump 24 was driven at 80 ml/min. When the chlorine concentration of gas generated from the exhaust pipe 20 was measured by the gas-detector pipe, it was 100–200 ppm. The gas containing chlorine was introduced into the reaction vessel 5. The reaction vessel has a capacitance of about 1200 ml, where a gas containing trichloroethylene (TCE) of 700 ppm was fed from a gas tank 1 (standard gas generating apparatus, GasTech, PD-1B) at 100 ml/min. The lights of three black light fluorescent lamps 4 (brand name: FL10BLB; available from Toshiba Corporation, 10 W) were transversely emitted to the reaction pipe. The emission intensity was 0.3 to 0.5 mW/cm$^2$. The TCE concentration of gas to be exhausted from the exhaust pipe 6 connected to the reaction pipe was measured by gas chromatography (GC-14B with FID detector available from Shimadzu Corporation. As a column, DB-624 available from J & W was used.). As a result, it was found that 99.5% or more of the gas is decomposed. In addition, when a solution in which the pH and residual chlorine are different from any other was prepared, and decomposition was evaluated, all of the concentrations were observed to have been lowered with an elapse of time. Therefore, the gas obtained by applying air ventilation and air seasoning to the above synthetic solution was mixed with the TCE gas, and light emission was carried out, thereby making it possible to decompose the TCE. In addition, it was verified that TCE can be decomposed for a different light intensity.

(Embodiment 20)

With respect to a water solution in which pure water was prepared so that sulfuric acid is 0.006 N, and sodium hypochlorite is 0.002 M, the pH, oxidization and reduction potential, and residual chlorine concentration were measured. As a result, the pH was 2.0, the oxidization and reduction potential was 1200 mV, and the residual chlorine concentration was 120 mg/l. Experiment was carried out in the same manner as that in Embodiment 19 except that this solution was employed. As a result, it was found that 99.5% or more of the TCE is decomposed. In addition, when a solution in which the pH and residual chlorine are different from any other was prepared, and was evaluated, all of the concentrations were observed to have been lowered with an elapse of time. In this manner, it was found that the gas obtained by applying air ventilation and air seasoning to the above synthetic solution was mixed with the TCE gas, and light emission was carried out, thereby making it possible to decompose TCE. In addition, it was verified that TCE can be decomposed for a different light intensity.

(Embodiment 21)

As a weak acid water powder generating agent, the brand name, Xynothane 21X (available from Clean Chemicals Co., Ltd.) was employed. The xynothane 21X is commercially available for sterilization, and the main component is $N_3C_3O_3NaCl_2$. The Xynothane 21X was dissolved in city water at a rate of 175 mg/l. At this time, the pH was 4.9, the oxidization and reduction potential was 780 mV, and the chlorine concentration was 65 mg/l. Experiment was carried out in the same manner as that in Embodiment 19 except that a solution to be poured in the water vessel 22 is replaced with this solution. As a result, 90% or more of TCE was found to have been decomposed. In addition, when a solution in which the pH and residual chlorine are different from any other was prepared, and decomposition was evaluated, all of the concentrations were observed to have been lowered with an elapse of time. In this manner, it was found that the gas obtained by applying air ventilation and air seasoning to the above synthetic solution was mixed with the TCE gas, and light emission was carried out, thereby making it possible to decompose TCE. In addition, it was verified that TCE can be decomposed for a different light intensity.

(Embodiment 22)

Sodium hypochlorite was dissolved in city water, and was prepared to 2 mM. At this time, the pH was 9.1, the oxidization and reduction potential was 543 mV, and the chlorine concentration was 165 mg/l. This solution was poured in the water vessel 22 shown in FIG. 2 of Embodiment 19, and decomposition experiment was carried out in the same manner as that in Embodiment 19. The TCE concentration of gas to be exhausted from the exhaust pipe 6 connected to the reaction pipe was measured by gas chromatography (GC-14B with FID detector available from Shimadzu Corporation. As a column, DB-624 available from J & W was used.). As a result, 90% or more of the gas was found to have been decomposed. In addition, when a solution in which the pH and residual chlorine are different from any other was prepared, and decomposition was evaluated, all of the concentrations were observed to have been lowered with an elapse of time. In this manner, it was found that the gas obtained by applying air ventilation and air seasoning to the above synthetic solution was mixed with the TCE gas, and light emission was carried out, thereby making it possible to decompose TCE. In addition, it was verified that TCE can be decomposed for a different light intensity.

(Embodiment 23)

Sodium hypochlorite of 0.13 mM was dissolved in city water, and further, a solution in which a hydrochloric acid of 0.002 N was dissolved was prepared. At this time, the pH was 2.6, and the residual chlorine concentration was 9 mg/l.

This solution was poured into the water vessel 22 shown in FIG. 2 of Embodiment 19, and decomposition experiment was carried out in the same manner as that in Embodiment 19. The TCE concentration of gas to be exhausted from the exhaust pipe 6 connected to the reaction pipe was measured by gas chromatography (GC-14B with FID detector available from Shimadzu Corporation. As a column, DB-624 available from J & W was used.). As a result, 95% or more of the gas was found to have been decomposed. In addition, when a solution in which the pH and residual chlorine are different from any other was prepared, and decomposition was evaluated, all of the concentrations were observed to have been lowered with an elapse of time. In this manner, it was found that the gas obtained by applying air ventilation and air seasoning to the above synthetic solution is mixed with the TCE gas, and light emission is performed, thereby making it possible to decompose TCE. In addition, it was verified that TCE can be decomposed for a different light intensity.

(Embodiment 24)

With respect to a water solution in which pure water was prepared so that hydrochloric acid is 0.001 to 0.1 N, sodium chloride is 0.005 to 0.02 N, and sodium hypochlorite is 0.0001 to 0.01 M, the pH, oxidization and reduction potential, and residual chlorine concentration were measured. As a result, the pH was changed to 1.0 to 4.0, the oxidization and reduction potential was changed to 800 to 1500 mV, and the residual chlorine concentration was changed to 5 to 150 mg/l. Here, when the hydrochloric acid was 0.006 N, sodium chloride was 0.014 N, and the sodium hypochlorite was 0.002 M, the pH was 2.3, the oxidization and reduction potential was 1180 mV, the residual chlorine concentration was 105 mg/l, and this solution was served to experiment.

This solution was poured into the water vessel 22 shown in FIG. 2, and a pump 24 was driven at 80 ml/min. The chlorine concentration of gas passing through the exhaust pipe 20 was measured by the detector pipe. The measurement was 100–200 ppm. The gas containing chlorine was introduced into the reaction pipe 5. The reaction pipe has a capacitance of about 1200 ml, where a gas containing 100 ppm of tetrachloroethylene (PCE) was fed from the tank 1 for storing a gas targeted for decomposition (standard gas generating apparatus, GasTech, PD-1B) at 100 ml/min. The lights of three black light fluorescent lamps 4 (brand name: FL10BLB; available from Toshiba Corporation, 10 W) were transversely emitted to the reaction pipe. The light emission intensity was 0.3 to 0.5 mW/cm$^2$. The PCE concentration of gas to be exhausted from the exhaust pipe 6 connected to the reaction pipe was measured by gas chromatography (GC-14B with FID detector available from Shimadzu Corporation. As a column, DB-264 available from J & W was used.). As a result, 99.5% or more of the gas was found to have been decomposed. In addition, when a solution in which the pH and residual chlorine are different from any other was prepared, all of the concentrations were observed to have been lowered with an elapse of time. In this manner, it was found that the gas obtained by applying air ventilation and air seasoning to the above synthetic solution was mixed with PCE gas, and light emission was performed, thereby making it possible to decompose PCE. In addition, it was verified that PCE can be decomposed for a different light intensity.

(Embodiment 25)

Decomposition experiment similar to that in Embodiment 24 was carried out except that a compound targeted for decomposition was replaced with dichloromethane of 1000 ppm. As a result, it was found that 99.5% or more was decomposed. In addition, a solution in which the pH and residual chlorine are different from any other was prepared, the decomposition was evaluated. As a result, it was observed that all of the concentrations ware lowered with an elapse of time. Therefore, it was found that the gas obtained by air ventilation and air seasoning to the above synthetic solution was mixed with the dichloromethane gas, and light emission was carried out, thereby making it possible to decompose dichloromethane. In addition, it was verified that dichloromethane can be decomposed for a different light intensity.

(Embodiment 26)

Functional water was prepared using a strongly acidic functional-water generating apparatus (brand name: strong electrolytic water generator (Model FW-200); available from Amano Co., Ltd.). A diaphragm was arranged between an anode and a cathode. This apparatus was employed, and the electrolytic concentration and electrolyzing time of water to be electrolyzed were variously changed. The resultant pH and oxidization and reduction potential of acidic functional water obtained on the anode side were measured by a pH meter (TCX-90i and KP900-2N available from Toko Chemicals Laboratory) and a conductivity meter (TCX-90i and KM900-2N available from Toko Chemicals Laboratory); and the chlorine concentration was measured by a chlorine test paper (AdvanTech). As a result, the pH of this functional water was changed to 1.0 to 4.0; the oxidization and reduction potential was changed to 800 mV to 1500 mV; and the chlorine concentration was changed to 5 mg/l to 150 mg/l depending on the concentration (standard concentration was 1000 mg/l); electrolytic current value, and electrolyzing time of electrolytic sodium chloride. In this embodiment, functional water of 2.1 in pH, 1150 mV in oxidization and reduction potential, and 64 mg/l in residual chlorine concentration was provided. The functional water was obtained by setting an electrolyte (sodium chloride) concentration to 1000 mg/l, and the electrolyzing time to 11 minutes.

This solution was supplied to a container 51 for generating a gas containing chlorine gas shown in FIG. 4, and a pump 39 was driven at 80 ml/min. The chlorine concentration of gas generated from the exhaust pipe 53 was measured by a detector pipe. The measurement was 100 to 200 ppm. The gas containing chlorine was introduced into the reaction pipe 5. The reaction pipe has a capacitance of about 1200 ml, where the gas containing 700 ppm of trichloroethylene (TCE) was fed from a tank 1 for storing a gas targeted for decomposition (standard gas generating apparatus, GasTech, PD-1B) at 100 ml/min. The light of a black light fluorescent lamp 4 (brand name: FL10BLB; available from Toshiba Corporation, 10 W) was emitted from the inside of the reaction pipe. The emission light quantity was 0.3 to 0.5 mW/cm$^2$. The TCE concentration of gas to be exhausted from the exhaust pipe 6 connected to the reaction pipe was measured by gas chromatography (GC-14B with FID detector available from Shimadzu Corporation. As a column, DB-624 available from J & W was used.) It was found that 99.5% or more of the gas was decomposed. In addition, a solution in which the pH and residual chlorine are different from any other was prepared, the concentration of chlorine to be generated was changed and was evaluated. As a result, the lowered concentrations were observed. In this manner, it was found that the gas obtained by applying air ventilation and air seasoning to the functional water liquid using the above apparatus was mixed with the TCE gas, and light emission was performed, thereby making it possible to decompose TCE. In addition, it was verified that TCE can be decomposed,for a different light intensity.

(Embodiment 27)

Experiment was carried out in the same manner as that in FIG. 3 except that a strong electrolyte water generator in which a diaphragm between an anode and a cathode was removed was employed. The electrolytic concentration of water to be electrolyzed was variously changed using a strong electrolyte water generator (Model FW-200; Amano Co., Ltd.) in which a diaphragm between an anode and a cathode was removed; the pH and oxidation-reduction potential of acidic functional water obtained on the anode side was measured by a pH meter (TCX-90i and KP900-2N available from Toko Chemicals Laboratory) and a conductivity meter (TCX-90i and KM900-2N available from Toko Chemicals Laboratory); and the chlorine concentration was measured by a chlorine test paper (AdvanTech). As a result, the pH of this functional water was changed to 4.0 to 10.0; the oxidation-reduction potential was changed to 300 to 800 mV; and the chlorine concentration was changed to 2 to 70 mg/l depending on the concentration of electrolytic sodium chloride (standard concentration is 1000 mg/l), the electrolytic current value, and the electrolyzing time or the like. In the present embodiment, the above generator was operated under conditions in which a functional water of 7.9 in pH, 570 mV in oxidation-reduction potential, and 15 mg/l in residual chlorine concentration; and was ventilated in an electrolyte vessel in operation, and decomposition experiment was carried out in the same way as that in Embodiment 18. The TCE concentration of gas to be exhausted from the exhaust pipe 6 connected to the reaction pipe was measured by gas chromatography (GC-14B) with FID detector available from Shimadzu Corporation. As a column, DB-624 available from J & W was used.). As a result, It was found that 90% or more of the gas was decomposed. In addition, operation was carried out under conditions in which the pH and residual chlorine are different from any other, and decomposition was evaluated. As a result, it was observed that all of the concentrations were lowered. In this manner, the gas obtained by air ventilation and air seasoning to the functional water liquid using the above apparatus was mixed with the TCE gas, and light emission was carried out, thereby making it possible to decompose TCE. In addition, it was verified that TCE can be decomposed for a different light intensity.

(Embodiment 28)

The strong electrolyte water generator employed in Embodiment 27 was employed, and functional water of 7.9 in pH, 570 mV in oxidation-reduction potential and 15 mg/l in residual chlorine concentration was provided. This functional water was obtained by setting the electrolytic concentration to 1000 mg/l and operating the strong electrolyte water generator for 11 minutes. This solution was supplied to a chlorine gas-containing gas generating container 51 of FIG. 4, and decomposition experiment was carried out in the same way as that in Embodiment 26.

The TCE concentration of gas to be exhausted from the exhaust pipe 6 connected to the reaction vessel 5 was measured by gas chromatography (GC-14B with FID detector available from Shimadzu Corporation, Co., Ltd. As a column, DB-624 available from J & W was used.) As a result, 90% or more of TCE was found to have been decomposed. In addition, a solution in which the pH and residual chlorine are different from any other was prepared, and the generated chlorine concentration was changed., and evaluated. As a result, it was observed that all of the concentrations were lowered. Therefore, it was found that the gas obtained by air ventilation and air seasoning to functional water liquid using the above apparatus was mixed with the TCE gas, and light emission was carried out, thereby making it possible to decompose TCE. In addition, it was verified that TCE can be decomposed for a different light intensity.

(Embodiment 29)

Decomposition experiment was carried out in the same way as that shown in Embodiment 18 except that a compound targeted for decomposition was replaced with tetrachloroethylene of 100 ppm. As a result, it was found that 99.5% or more was decomposed. In addition, the aforementioned apparatus was operated under a condition in which the pH and residual chlorine are different from any other, and decomposition was evaluated. As a result, it was observed that all of the concentrations were lowered. As a result, it was observed that all of the concentrations were lowered. Therefore, it was found that the gas obtained by air ventilation and air seasoning to functional water liquid using the above apparatus was mixed with the PCE gas, and light emission was carried out, thereby making it possible to decompose PCE. In addition, it was verified that PCE can be decomposed for a different light intensity.

(Embodiment 30)

Decomposition experiment similar to that in Embodiment 26 was carried out except that a compound targeted for decomposition was replaced with tetrachloroethylene. As a result, it was found that 99.5% or more was decomposed. In addition, a solution in which the pH and residual chlorine are different from any other was prepared, and the generated chlorine concentration was changed and evaluated. As a result, it was observed that all of the concentrations were lowered. Therefore, it was found that the gas obtained by air ventilation and air seasoning to the functional water using the above apparatus was mixed with the PCE gas, and light emission was carried out, thereby making it possible to decompose PCE. In addition, it was verified that PCE can be decomposed for a different light intensity.

(Embodiment 31)

Decomposition experiment similar to that in Embodiment 27 was carried out except that a compound targeted for decomposition was replaced with tetrachloroethylene of 100 ppm. As a result, it was found that 90% or more was decomposed. In addition, a solution in which the pH and residual chlorine are different from any other was prepared, and the generated chlorine concentration was changed and evaluated. As a result, it was observed that all of the concentrations were lowered. Therefore, it was found that the gas obtained by air ventilation and air seasoning to the functional water by using the above apparatus was mixed with the PCE gas, and light emission was carried out, thereby making it possible to decompose PCE. In addition, it was verified that PCE can be decomposed for a different light intensity.

(Embodiment 32)

Decomposition experiment similar to that in Embodiment 28 was carried out except that a compound targeted for decomposition was replaced with tetrachloroethylene of 100 ppm. As a result, it was found that 90% or more was decomposed. In addition, a solution in which the pH and residual chlorine are different from any other was prepared, and the generated chlorine concentration was changed and evaluated. As a result, it was observed that all of the concentrations were lowered. Therefore, it was found that the gas obtained by air ventilation and air seasoning to the functional water by using the above apparatus was mixed with the PCE gas, and light emission was carried out, thereby making it possible to decompose PCE. In addition, it was verified that PCE can be decomposed for a different light intensity.

(Embodiment 33)

Decomposition experiment similar to that in Embodiment 18 was carried out except that a compound targeted for decomposition was replaced with dichloromethane of 1000 ppm. As a result, it was found that 99.5% or more was decomposed. In addition, a solution in which the pH and residual chlorine are different from any other was prepared, and the generated chlorine concentration was changed and evaluated. As a result, it was observed that all of the concentrations were lowered. Therefore, it was found that the gas obtained by air ventilation and air seasoning to the functional water by using the above apparatus was mixed with the dichloromethane gas, and light emission was carried out, thereby making it possible to decompose dichloromethane. In addition, it was verified that dichloromethane can be decomposed for a different light intensity.

(Embodiment 34)

Decomposition experiment similar to that in Embodiment 26 was carried out except that a compound targeted for decomposition was replaced with dichloromethane of 1000 ppm. As a result, it was found that 99.5% or more was decomposed. In addition, a solution in which the pH and residual chlorine are different from any other was prepared, and the generated chlorine concentration was changed and evaluated. As a result, it was observed that all of the concentrations were lowered. Therefore, it was found that the gas obtained by air ventilation and air seasoning to the functional water by using the above apparatus was mixed with the dichloromethane gas, and light emission was carried out, thereby making it possible to decompose PCE. In addition, it was verified that dichloromethane can be decomposed for a different light intensity.

(Embodiment 35)

Decomposition experiment was carried out in the same way as that in Embodiment 4 except that a blue fluorescent lamp was employed as an emission light source, and an initial concentration was set as follows: That is, a TCE gas was added by a gas tight syringe through a butyl rubber plug so that the TCE gas concentration in a glass vial bottle is 100 ppm, and the PCE gas concentration is 50 ppm. Further, a chlorine gas was added through the gas tight syringe through the butyl rubber plug so that the chlorine gas concentration in the glass vial bottle is 100 ppm. Thereafter, the gas was subjected to a color fluorescent lamp (blue) emitting light of 380 nm to 600 nm (brand name: FL20S.B; available from Toshiba Corporation, 10 W), and was left for one hour. The light emission intensity was 40 to 60 µW/cm². Next, the PCE and TCE concentrations in the glass vial bottle were measured. As a result, both of the TCE and PCE concentrations were below a detectable limit.

(Embodiment 36)

A plurality of glass vial bottles of 27.5 ml in capacitance were provided, the TCE raw liquid of 10 mg was added to each glass vial bottle. Then, each glass vial bottle was sealed with a butyl rubber cap lined with Teflon and an aluminum seal. Next, a chlorine gas was added by a gas tight syringe through a butyl rubber plug and was left for half a day so that the chlorine gas concentration in each glass vial bottle is 300 ppm. Thereafter, all samples were subject to sun light, and was left for 0.5 hour. At this time, the light emission intensity was 0.4 to 0.8 mW/cm$^2$. As a result, 99.8% of the TCE in each glass vial bottle was decomposed on average.

(Embodiment 37)

A plurality of standard cells with a quartz glass based screw cap (available from GL Science Inc.) were provided, each of which was sealed using a Teflon silicon septum and an opening top cap. Next, a TCE gas was added to each quartz cell by a gas tight syringe of 0.025 mg through the Teflon silicon septum. Further, a chlorine gas was added by a gas tight syringe through a Teflon silicon septum so that the chlorine gas concentration in each glass vial bottle is 100 ppm. This was defined as sample group A. As a control experiment, those in which the same ultraviolet rays are emitted without adding chlorine were provided, and this was defined as sample group B.

Figure 7:
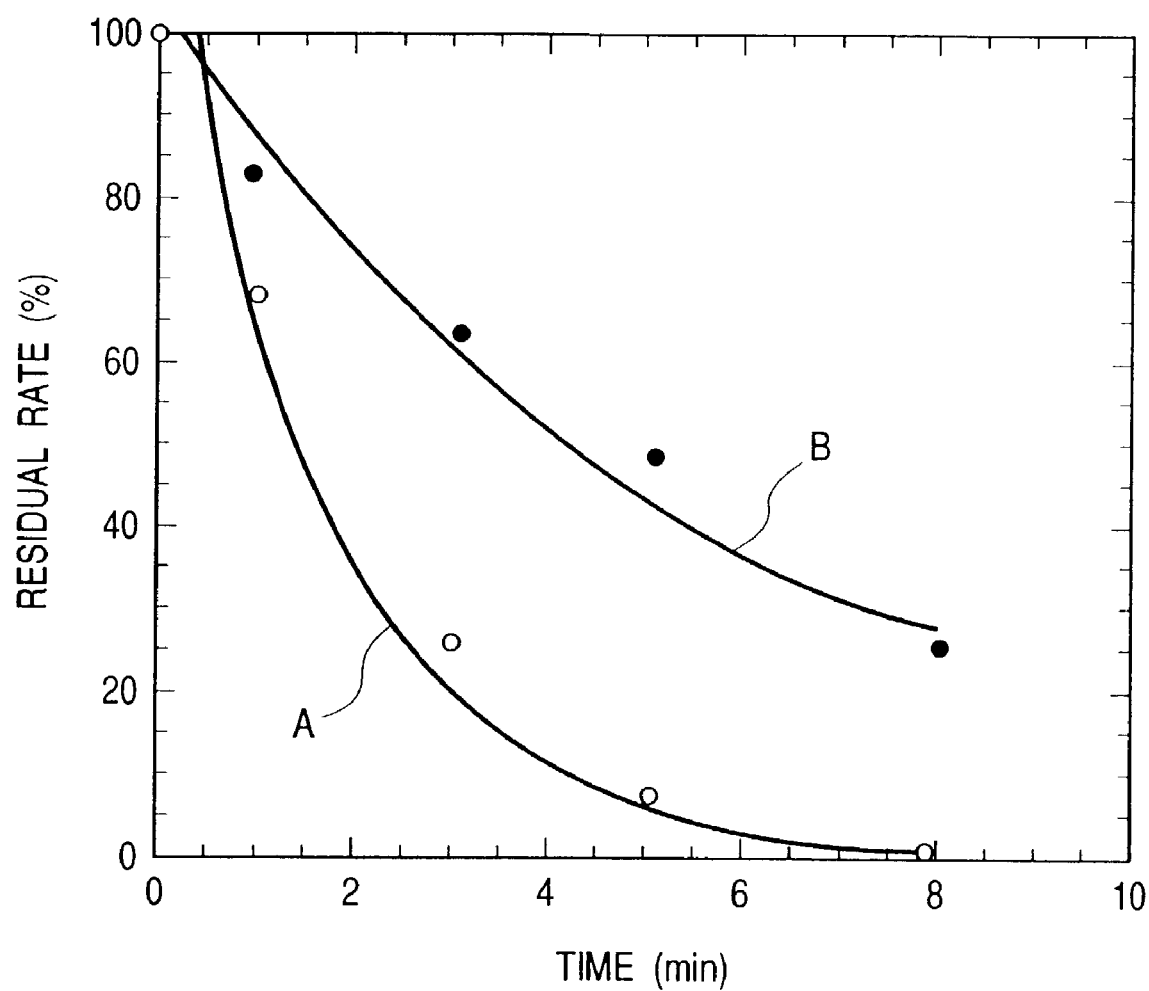
FIG. 7 is a graph depicting a residual trichloroethylene concentration in Embodiment 37.

The short-wavelength light (254 nm) of an ultraviolet lamp (brand name: MODEL UVGL-58; UVP Inc.) was emitted to these sample groups A and B, and a change in TCE concentration with an elapse of time was measured. For the TCE concentration, a gas phase of a glass vial bottle was sampled by gas tight syringe, and the TCE concentration was measured by employing gas chromatography (GC-14B with FID detector available from Shimadzu Corporation. As a column, DB-624 available from J & W was used.). The result is shown in FIG. 7.

From the foregoing, in emission of ultraviolet rays of 254 nm capable of decomposing TCE through light emission also, it was found that addition of a chlorine gas to a target gas promotes decomposition due to ultraviolet rays of 254 nm. In addition, it was verified that decomposition of TCE is promoted for a different chlorine concentration and light intensity.

(Embodiment 38)

A decomposing apparatus shown in FIG. 6 was assembled using a strongly acidic electrolytic water generating apparatus 45 (brand name: Oasis Bio-half; available from Asahi Glass Engineering Co., Ltd.). A functional water formed on the anode side of a functional-water generating apparatus was supplied to the reaction vessel 5 continuously via a pump 49 and a pipe 47 at a desired flow rate. A gas containing a contamination gas for air ventilation was supplied to the bottom of the reaction vessel 5 via a supply pipe 38 and a pump 39 continuously at a desired flow rate. At this time, the gas for performing air ventilation contains a gas targeted for decomposition that is supplied from an apparatus 1 for supplying the gas targeted for decomposition.

As a result, a gas containing a chlorine gas is introduced into the reaction vessel 5 in a state that the gas contains the gas targeted for decomposition. The composition of the gas targeted for decomposition is as follows:

| | |
|---|---|
| Dichloromethane | 200 ppmV |
| Trichloroethylene | 500 ppmV |
| Tetrachloroethylene | 300 ppmV |

The reaction vessel 5 is a glass-based column of 6 cm in diameter and 70 cm in length, where a functional water having pH 2.3 and the residual chlorine concentration of 60 mg/l is continuously supplied at 5 ml/min from the strongly acidic electrolytic water generating apparatus 45. The functional water is filled in advance up to 10 cm from the bottom of the glass column, and is exhausted at 5 ml/min, thereby maintaining a water level. The contamination gas is ventilated in the functional water at 50 ml/min. The entire column was light-emitted by light emitting means 4 (black light fluorescent lamp (brand name: FL40S.BLB; available from Toshiba Corporation, 40 W). The light emission intensity was 0.3 to 0.5 mW/cm$^2$. The concentration of the contamination gas exhausted from the exhaust pipe designated by reference numeral 6 was measured. As a result, 99% or more of the gas was removed, and it was found that the contamination gas can be highly decomposed by this apparatus.

(Embodiment 39)

Figure 9:
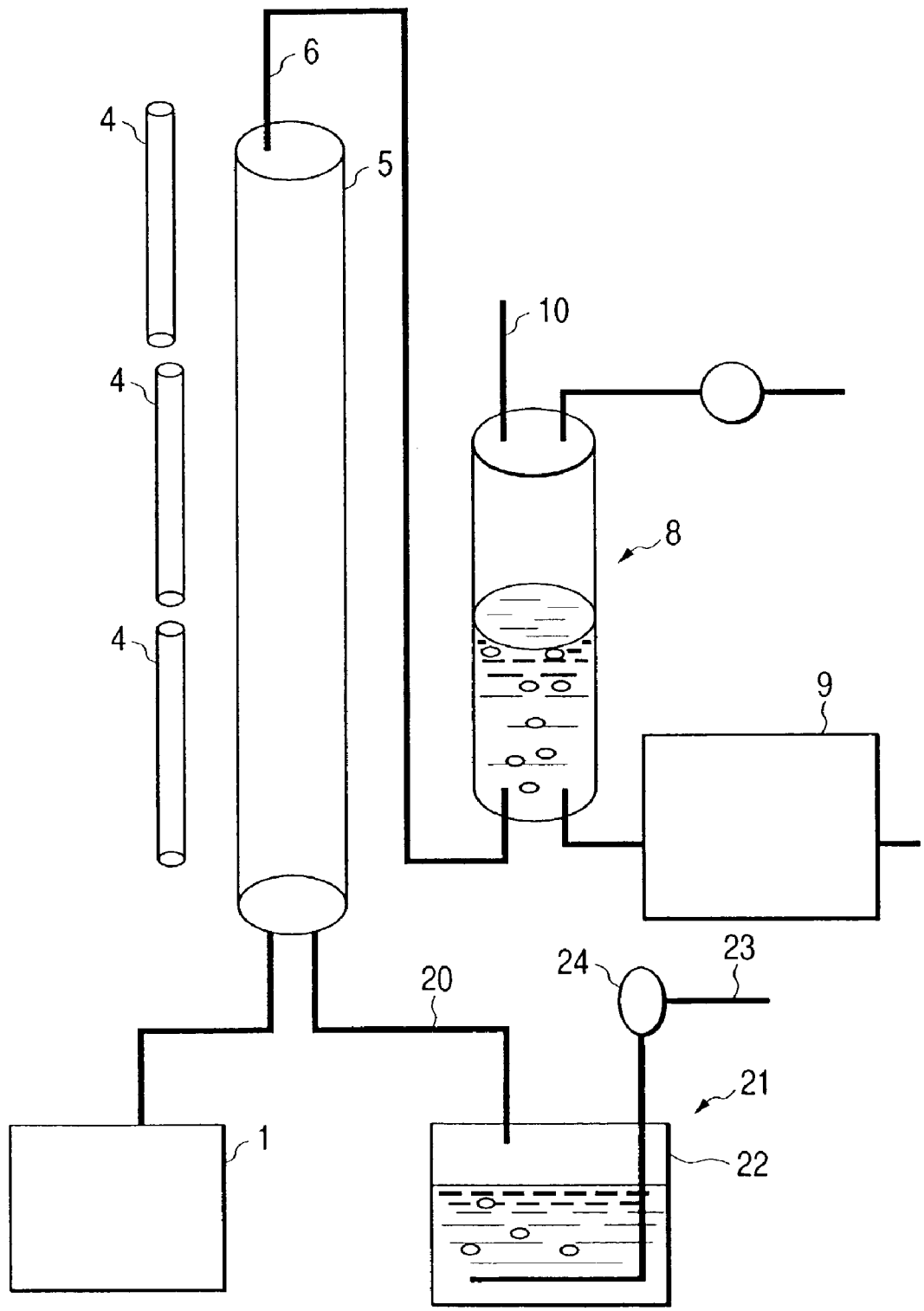
FIG. 9 shows an apparatus for decomposing a gaseous aliphatic hydrocarbon halide compound employed in Embodiment 39.

FIG. 9 is a schematic view showing a decomposing apparatus of a gaseous aliphatic hydrocarbon halide compound employed in the present embodiment, wherein reference 21 denotes chlorine gas-containing air generating means that comprises a chlorine solution-containing water vessel 22; a pipe 23 for blowing air into the solution; and a pump 24 for adjusting a quantity of air. The air passing through a chlorine solution is changed to a chlorine-gas containing air, and is guided to the reaction vessel 5. A chlorine solution to be poured in the water vessel 22 was adjusted so that hydrochloric acid is 0.001 to 0.1 N, and a sodium hypochlorite is 0.0001 to 0.01 M. The pH, oxidation-reduction potential, and residual chlorine concentration of the above solution was measured. As a result, the pH was changed to 1.0 to 4.0; the oxidation-reduction potential was changed to 800 mV to 1500 mV; and the residual chlorine concentration was changed to 5 to 200 mg/l. When hydrochloric acid of 0.006 N, sodium chloride of 0.014 N, and sodium hypochlorite of 0.002 M were defined, the pH 2.3, the oxidation-reduction potential of 1180 mV, and the residual chlorine concentration of 105 mg/l were obtained, and this solution was served to experiment.

This solution was supplied to the water vessel 22 of FIG. 9 at a flow rate of 120 ml/min by adjusting a valve 24. The chlorine concentration of the gas generated from the exhaust pipe 20 was measured by a gas-detector pipe. As a result, the concentration was 100 to 200 ppm. This chlorine-containing gas was introduced into the reaction vessel 5. The reaction vessel has a capacitance of about 1200 ml, wherein a gas containing trichloroethylene (TCE) of 1200 ppm was fed from the gas tank 1 (standard gas generating apparatus, GasTech, PD-1B) at 100 ml/min. The light of the three black light fluorescent lamps 4 (brand name: FL10BLB; available from Toshiba Corporation, 10 W) was emitted transversely to the reaction pipe. The light emission intensity was 0.3 to 0.5 mW/cm$^2$. The concentration of TCE or the like in the gas contained in the exhaust pipe 6 connected to the reaction pipe was measured by gas chromatography (GC-14B with FID detector available from Shimadzu Corporation. As a column, DB-624 available from J & W was used.). As a result, it was found that 99% or more of the gas was decomposed. In addition, a solution in which the pH and residual chlorine are different from any other was prepared, and was evaluated. As a result, it was observed that all of the concentrations were lowered.

However, a chloride substance which seems to have been produced by decomposition of TCE was observed. This gas was supplied into treatment tanks 8 at a similar flow rate. The water solution in each of the treatment tanks 8 was a sodium hydroxide solution of 0.5%. As a result, chlorine and the above chlorine compound were not detected from the exhaust pipe 10, and a very small amount of dichloroacetic acid was detected in the exhaust liquid from the treatment tank 8.

Further, this solution was fed to a microorganism vessel 9. Soils and its bacteria taken from Morinosato, Atsugi City, Kanagawa Prefecture were employed for microorganism vessels 9. Microorganism treatment was carried out after the residence time had been set to 6 hours. As a result, a peak of dichloro acetic acid that seems to have been produced by decomposition of TCE disappeared.

Therefore, it was proved that exhaust gas and liquid are completely purified.

(Embodiment 40)

Figure 10:
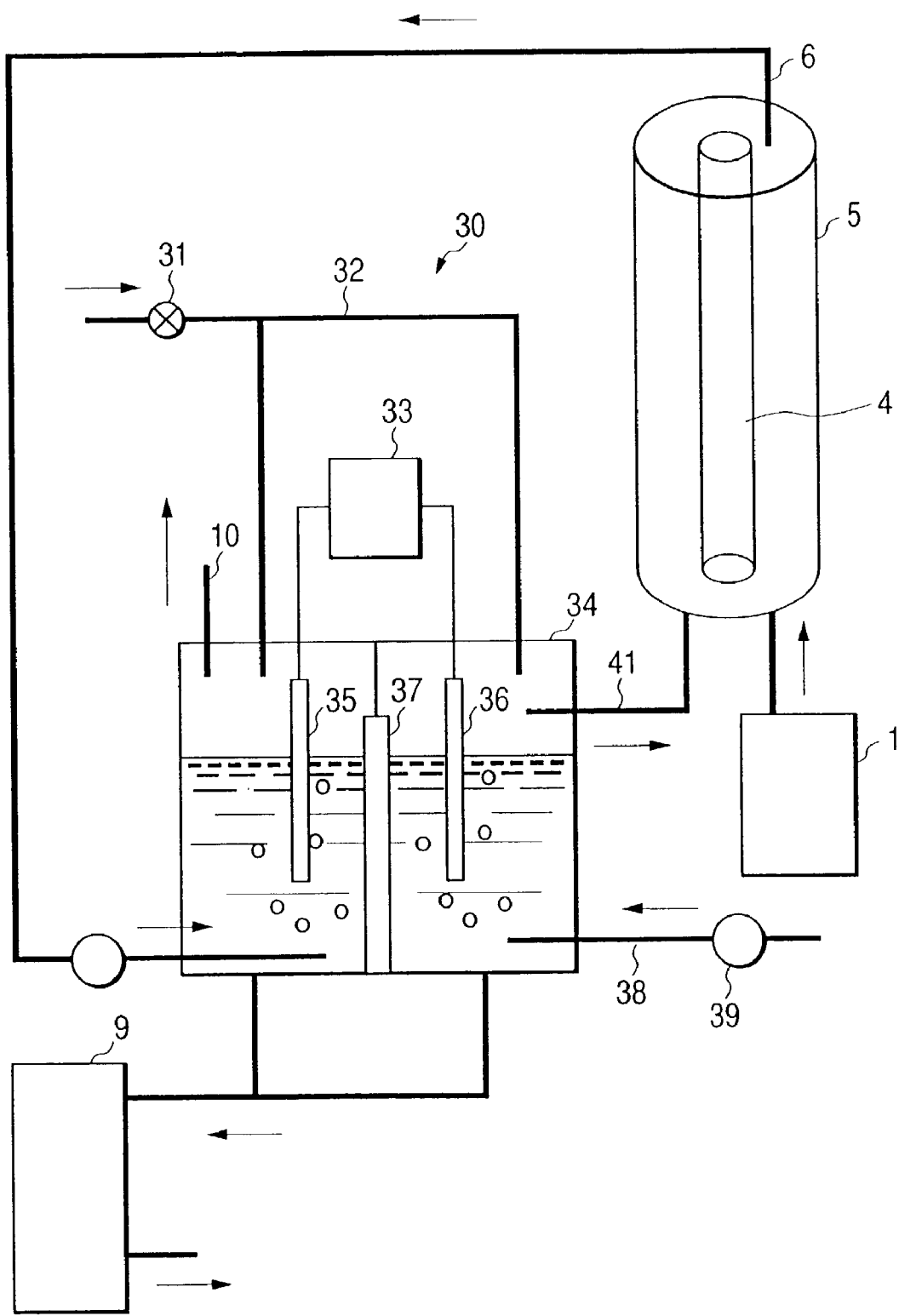
FIG. 10 shows an apparatus for decomposing a gaseous aliphatic hydrocarbon halide compound employed in Embodiment 40.

FIG. 10 is a schematic view showing a decomposing apparatus of a gaseous aliphatic hydrocarbon halide compound according to the present invention, which was employed in Embodiment 40. Specifically, there is shown a schematic view of the apparatus construction in which air is ventilated in a solution to be produced in the vicinity of an anode 36 by water electrolysis, thereby producing a chlorine gas-containing gas; the gas is introduced into the reaction vessel 5, thereby decomposing a gaseous aliphatic hydrocarbon halide compound; and a decomposed treatment gas is ventilated in a solution produced in the vicinity of a cathode by water electrolysis, thereby converting the decomposed product.

In the figure, reference numeral 30 denotes a chlorine gas-containing gas generating means; and reference numeral 34 denotes a water vessel. The water vessel 34 comprises a cathode 35 and an anode 36, a diaphragm 37 such as ion exchange membrane; a power source 33 connected to the electrode; pipe 32 and pump 31 for, supplying an electrolyte-containing water into the water vessel; and pipe 38 and pump 39 for supplying a ventilation gas into the water vessel, wherein a functional water in which the residual chlorine concentration was lowered in the water vessel 34 by air ventilation and alkaline water generated on the cathode side are supplied to the microorganism vessel 9. A water in which an electrolyte is dissolved in the water vessel 34 was supplied through a pipe 32, and the water vessel 34 is filled with the water in which the electrolyte was dissolved. When power is supplied from the power source 33 to electrolysis electrodes 35 and 36, acidic electrolytic water is generated on the anode 36 side. When a ventilation gas is supplied to the anode 36 side of the water vessel 34 via a pipe 38 continuously at a desired flow rate, a chlorine-containing gas is exhausted from the exhaust pipe 41. This chlorine-containing gas is introduced into the reaction vessel 5. On the other hand, a gas containing an organic chlorine compound is fed from the tank 1 for storing a gas targeted for decomposition to the reaction vessel 5. The gas mixed inside the reaction vessel is exhausted from the exhaust pipe 6 connected to the reaction pipe when the light of the back light fluorescent lamp 4 is emitted, and decomposition reaction occurs. The decomposed gas and chlorine from the acidic functional water are exhausted from the exhaust pipe 6, and are supplied to a cathode vessel by means of a pump. The gas passing through the cathode vessel and having chlorine or the like removed is exhausted from the gas exhaust pipe 10.

As a diaphragm, for example, there is preferably employed an ion exchange membrane that prevents the electrolytic water solution on the cathode 35 and anode 37 sides each from moving to an opposite side; permits irreversible movement to a cathode side, of a positive ion (for example, $Na^+$, $Ca^{2+}$, $Mg^{2+}$, $K^+$ or the like) existing on the anode side, and permits irreversible movement to an anode side, of a negative ion (for example, $Cl^-$, $SO_4^{2-}$, $HCO_3^-$ or the like) existing on the cathode side. That is, a functional water having properties as described later can be efficiently produced in the vicinity of the anode side by employing an ion exchange membrane.

In the present embodiment, a functional water was prepared using strongly acidic functional water generating apparatus (brand name: strong electrolytic water generator (Model FW-200); available from Amano Co., Ltd.). A diaphragm was arranged between an anode and a cathode. By employing this apparatus and variously changing the electrolytic concentration and electrolyzing time of water to be electrolyzed, the resultant pH and oxidation-reduction potential of an acidic functional water to be obtained on the anode side were measured by th pH meter (TCX-90i and KP900-2N available from Toko Chemicals Laboratory) and the conductivity meter (TCX-90i and KM900-2N available from Toko Chemicals Laboratory); and the chlorine concentration was measured by the chlorine test paper (Advan-Tech). As a result, the pH of this functional water was changed to 1.0 to 4.0; the oxidation-reduction potential was changed to 800 to 1500 mV; and the chlorine concentration was changed to 5 to 150 mg/l depending on the concentration of electrolytic sodium chloride (standard concentration is 1000 mg/l), electrolytic current value, and electrolyzing time or the like. In the present embodiment, the above apparatus was operated under conditions in which a function water of 2.1 in pH, 1150 mV in oxidation-reduction potential, and 64 mg/l in residual chlorine concentration is generated. In operation, air ventilation was carried out on the anode side as shown in FIG. 10, and the chlorine concentration of the gas from the anode 36 side was measured by a gas-detector pipe. As a result, the measurement was 100 to 200 ppm. This chlorine-containing gas was introduced into the reaction pipe 5. The reaction pipe has a capacitance of about 1200 ml, wherein a gas containing trichloroethylene (TCE) of 1400 ppm was supplied from the tank 1 for storing a gas targeted for decomposition (standard gas generating apparatus, GasTeck, PD-1B) at 100 ml/min. The light of the black light fluorescent lamp 4 (brand name: FL10BLB; available from Toshiba Corporation, 10 W) was emitted from the inside of the reaction pipe. The light emission intensity was 0.3 to 0.5 $mW/cm^2$. The TCE concentration of the gas to be exhausted from the exhaust pipe 6 connected to the reaction pipe was measured by gas chromatography (GC-14B with FID detector available from Shimadzu Corporation. As a column, DB-624 available from J & W was used.). As a result, it was found that 99% or more of the gas is decomposed. In addition, the apparatus was operated under conditions in which the pH and residual chlorine are different from any other, and decomposition was evaluated. As a result, it was observed that all of the concentrations were lowered.

However, a chloride substance that seems to have been produced by decomposition of TCE was observed. This gas was supplied into a vessel on the cathode 35 side of the water vessel 34 at a similar flow rate. An alkaline electrolytic water is generated in a vessel on the cathode 35 side. As a result, chlorine and its compound was not detected from the exhaust pipe 10, and a very small amount of dichloro acidic acid was detected in the exhaust from the vessel on the cathode 35 side.

Further, this solution was fed to the microorganism vessel 9. Active sludge in an exhaust treatment vessel of Canon Central Laboratory was used for the microorganism vessel 9. Microorganism treatment was carried out by setting the residence time to 6 hours. As a result, a peak of dichloro acidic acid that seems to have been produced by decomposition of TCE disappeared. Therefore, it was provided that exhaust gas and liquid was completely purified.

(Embodiment 41)

Figure 11:
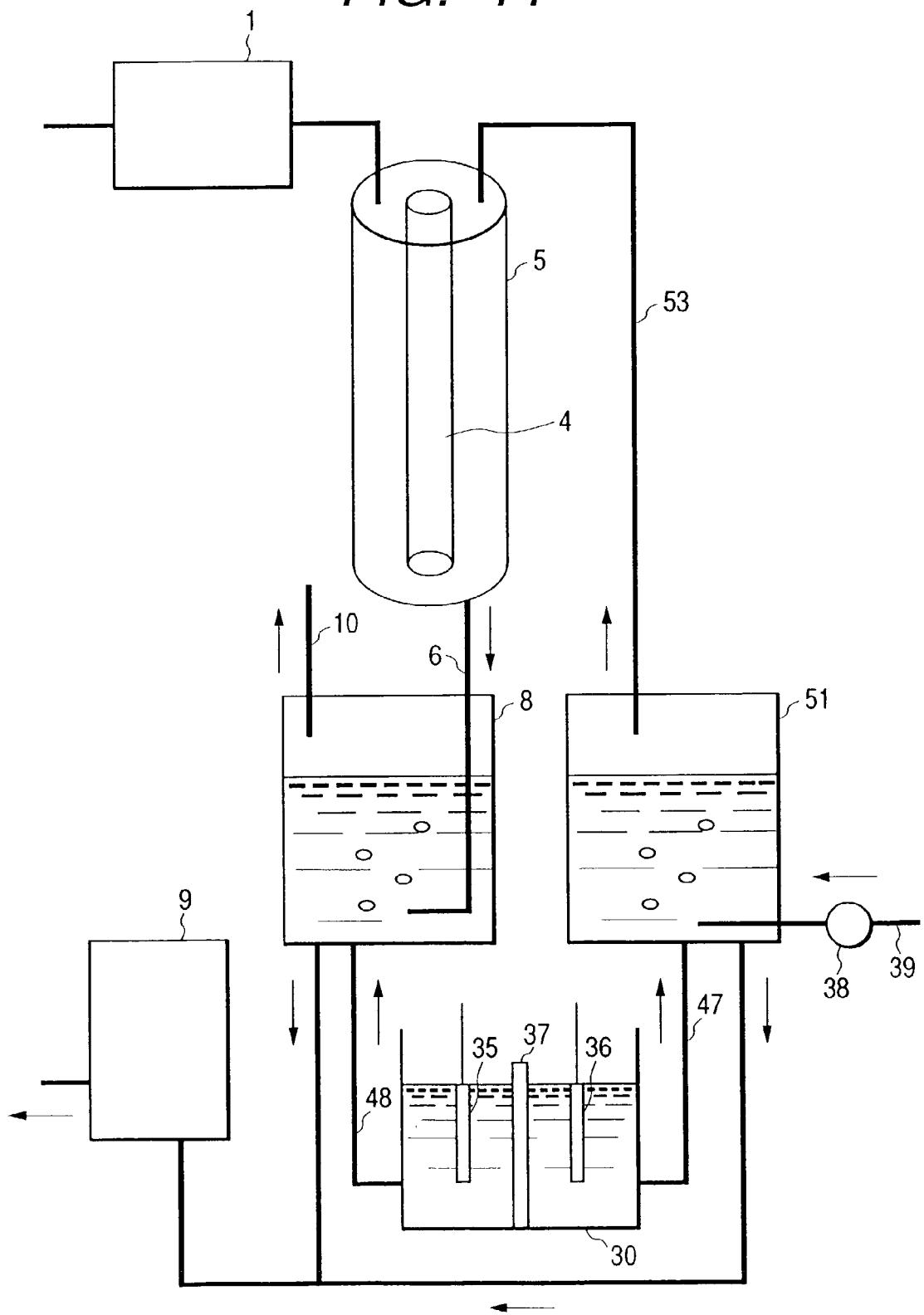
FIG. 11 is an apparatus for decomposing a gaseous aliphatic hydrocarbon halide compound employed in Embodiment 41.

FIG. 11 is a schematic view showing a decomposing apparatus of gaseous aliphatic hydrocarbon halide compound according to the present invention, which was employed in Embodiment 41. Reference numeral 30 denotes a functional water generating apparatus, wherein a functional-water to be formed on an anode side of a water vessel of the functional-water generating apparatus is supplied to a chlorine gas-containing gas generating vessel 51 via a pipe 47 continuously at a desired flow rate. A ventilation gas is supplied to the chlorine gas-containing gas generating vessel 51 continuously via a supply pipe 39 and a pump 38 continuously at a desired flow rate. As a result, a chlorine gas-containing gas is exhausted from the exhaust pipe 53. This chlorine-containing gas is introduced into the reaction vessel 5, and a compound targeted for decomposition is decomposed according to the above method. Functional water used for the treatment is exhausted from the generating vessel 51 to the microorganism vessel 9. Thus, in a method for generating a chlorine gas-containing air through an air in a chlorine solution, there is no need for providing a chlorine cylinder or the like, thus making it possible to supply chlorine safely, simply, and constantly.

The decomposed gas and chlorine from an acidic functional-water are exhausted from the exhaust pipe 6, and is supplied to the treatment tank 8. A functional water (alkaline electrolytic water) formed on the cathode 35 side of a water vessel of a functional water generating apparatus 30 is continuously supplied to the treatment tank 8 via a pipe 48 at a desired flow rate. The gas exhausted from the exhaust pipe 6 passes through the treatment tank 8 and is exhausted from the gas exhaust pipe 10 after chlorine or the like has been removed therefrom.

A functional water of 2.1 in pH, 1150 mV in oxidation-reduction potential, and 64 mg/l in residual chlorine concentration, which had been produced by a strongly acidic electrolytic water generator (brand name: Oasis Bio-half; available from Asahi Glass Engineering Co., Ltd.), was supplied to the chlorine gas-generating vessel 51 shown in FIG. 11, and a pump 39 was driven at 100 ml/min. The chlorine concentration of the gas generated from the exhaust pipe 53 was measured by the gas-detector pipe. The measurement was 100 ppm to 200 ppm. This chlorine-containing gas was introduced into the reaction pipe 5. The reaction pipe has a capacitance of about 1200 ml, where a mixture gas containing trichloroethylene (TCE) of 700 ppm, tetrachloroethylene (PCE) of 350 ppm, and dichloromethane of 200 ppm was fed from the tank 1 for storing a gas targeted for decomposition (standard gas generating apparatus, GasTeck, PD-1B) at 100 ml/min. The light of the black light fluorescent lamp 4 (brand name: FL10BLB; available from Toshiba Corporation, 10 W) was emitted from the inside of the reaction pipe. The light emission intensity was 0.3 to 0.5 mW/cm$^2$. The TCE concentration to be exhausted from the exhaust pipe 6 connected to the reaction pipe was measured by gas chromatography (GC-14B with FID detector available from Shimadzu Corporation. As a column, DB-624 available from J & W was used.). As a result, it was found that 98% or more of the gas is decomposed.

However, a chloride substance that seems to have been produced by decomposition was observed. This gas was supplied into the vessel of a treatment tank 8 at a similar flow rate. A functional water (an alkaline electrolytic water) formed on the cathode 35 side of the water vessel of the functional-water generating apparatus 30 was supplied to the treatment tank 8 continuously at a desired flow rate. As a result, chlorine and the above chlorine compound was not detected from the exhaust pipe 10, and a very small amount of dichloro acetic acid and trichloro acetic acid was detected in the exhaust liquid from the treatment tank 8. Then, this solution was introduced into the microorganism vessel 9. Activated sludge in the aeration tank of waste water treatment system of Canon Research Center was used for the microorganism vessel 9. Microorganism treatment was carried out by setting the residence time to 6 hours. As a result, a peak of dichloro acetic acid and trichloro acetic acid that seem to have been generated by decomposition of TCE or the like disappeared. Therefore, it was provided that exhaust gas and liquid are completely purified.

Although an example of using an air containing a chlorine gas obtained by passing air to a chlorine-containing solution with respect to a chlorine gas-containing gas has been described above, there may be occasionally employed an air containing a chlorine gas generated from a chlorine-containing solution without ventilating air to the chlorine-containing solution.

(Embodiment 42)

Experiment similar to that shown in Embodiment 41 was carried out except that an air-seasoned gas of a desorption water was targeted for decomposition. Soil contaminated by various aliphatic hydrocarbon halide compounds was vacuum-extracted, and the extracted contamination substance was adsorbed to an activated carbon. This adsorbed contamination substance was desorbed by steam, and desorption water was obtained. This air-seasoned gas was defined as a gas targeted for decomposition. This gas was measured by gas chromatography (GC-14B with FID detector available from Shimadzu Corporation. As a column, DB-624 available from J & W was used.). As a result, some peaks that seems to be TCE, PCE, dichloroethylene, chloroform, chlorobenzene or the like were observed.

It was found that 99% or more is decomposed by light emission decomposition, but a chloride substance that seems to have been produced by decomposition was observed.

As a result of this gas being passed through the inside of the vessel of the treatment tank 8, chlorine and the above chlorine compound were not detected from the exhaust pipe 10. Some peaks such as dichloro acetic acid and trichloro acetic acid or the like were detected in the exhaust liquid from the treatment tank 8.

Further, this solution was fed to the microorganism vessel 9, and microorganism treatment was carried out by setting the residence time to 6 hours. As a result, all of the previously observed peaks disappeared. Therefore, it was found that various aliphatic hydrocarbon halide compounds can be completely purified.

What is claimed is:

1. An apparatus for decomposing a gaseous aliphatic hydrocarbon halide compound or a gaseous aromatic halide compound, comprising:
   a chamber;
   gas generating means for generating a gas containing gaseous chlorine, the gas generating means including a container for holding a liquid containing chlorine and aeration means for aerating the liquid;
   gas mixing means for forming a mixed gas by mixing the gas containing gaseous chlorine generated by the gas generating means with the gaseous aliphatic hydrocarbon halide compound or the gaseous aromatic halide compound that is to be decomposed;

means for introducing into the chamber the mixed gas formed by the gas mixing means;

an irradiator for irradiating the mixed gas in the chamber with light; and means for exhausting from the chamber a decomposition product formed in the chamber.

2. The decomposing apparatus according to claim 1, wherein the aeration means comprises means for aerating a water containing chlorine with air.

3. The decomposing apparatus according to claim 2, wherein the water containing chlorine has a pH value of 1 to 4, an oxidation-reduction potential of 800 to 1500 mV, and a chlorine concentration of 5 to 150 mg/l.

4. The decomposing apparatus according to claim 2, wherein the water containing chlorine has a pH value of more than 4 and 10 or less, an oxidation-reduction potential of 300 to 1100 mV, and a chlorine concentration of 2 to 100 mg/l.

5. The decomposing apparatus according to claim 2, wherein the water containing chlorine is a water solution of a hypochlorite.

6. The decomposing apparatus according to claim 5, wherein the hypochlorite is at least a sodium hypochlorite or a potassium hypochlorite.

7. The decomposing apparatus according to claim 2, wherein the water containing chlorine further contains at least one of an inorganic acid and an organic acid.

8. The decomposing apparatus according to claim 7, wherein the inorganic and organic acids are at least one selected from the group consisting of hydrochloric acid, hydrofluoric acid, sulfuric acid, phosphoric acid, boric acid, acetic acid, formic acid, malic acid, citric acid, and oxalic acid.

9. The decomposing apparatus according to claim 2, wherein the air passed in the water containing chlorine contains a gaseous aliphatic hydrocarbon halide compound.

10. The decomposing apparatus according to claim 1, wherein the container comprises a water vessel and the means for aerating the liquid comprises means for introducing air to water obtained in a vicinity of an anode in the water vessel, and wherein the gas generating means further comprises:

(i) means for supplying water containing an electrolyte in the water vessel; and (ii) a pair of electrodes and power sources for applying a potential to the water containing the electrolyte in the water vessel.

11. The decomposing apparatus according to claim 1, wherein the light has a wavelength of at least 300 nm.

* * * * *

UNITED STATES PATENT AND TRADEMARK OFFICE
CERTIFICATE OF CORRECTION

PATENT NO. : 7,163,665 B2
APPLICATION NO. : 10/167549
DATED : January 16, 2007
INVENTOR(S) : Kinya Kato It is certified that error appears in the above-identified patent and that said Letters Patent is hereby corrected as shown below:

TITLE PAGE, ITEM (56) OTHER PUBLICATIONS

"Phtochemische" should read --Photochemische--; and
"JP 7-1164467," should read --JP 7-116467,--.

TITLE PAGE, ITEM (56) FOREIGN PATENT DOCUMENTS

"JP   6-246133   6/1964" should read --JP   6-246133   9/1994--;
"JP   79-029993 B   *   9/1979" should read --JP   54-29993 B   9/1979--; and
"JP   1-180293   1/1989" should read --JP   1-80293   7/1989--.

COLUMN 2

Line 27, "is characterized" should read --which is characterized--.

COLUMN 5

Line 37, "about" should be deleted; and "a mere" should be deleted.

COLUMN 7

Line 3, "the inside of which" should read --through the inside of which passes--;
Line 4, "passes through" should be deleted;
Line 47, "In case" should read --In the case--;
Line 49, "as a by-product" should read --by-products--; "product" should read --products--; and
Line 59, "environment." should read --the environment.--.

COLUMN 8

Line 7, "product" should read --products--; and
Line 10, "having" should be deleted.

COLUMN 9

Line 14, "environment" should read --the environment--;
Line 16, "Embodiment s" should read --Embodiments--;
Line 21, "bottle" should read --bottles--; and
Line 26, "emissions" should read --emission--.

UNITED STATES PATENT AND TRADEMARK OFFICE
CERTIFICATE OF CORRECTION

| | |
|---|---|
| PATENT NO. | : 7,163,665 B2 |
| APPLICATION NO. | : 10/167549 |
| DATED | : January 16, 2007 |
| INVENTOR(S) | : Kinya Kato |

It is certified that error appears in the above-identified patent and that said Letters Patent is hereby corrected as shown below:

COLUMN 11

Line 18, "used.)" should read --used.).--;
Line 30, "the glass" should read --each of the glass--; and "each" should be deleted; and
Line 31, "filters-having" should read --filters having--.

COLUMN 12

Line 43, "were sampled" should read --was sampled--.

COLUMN 13

Line 48, "concentrations was" should read --concentrations were--.

COLUMN 15

Line 29, "dichloroethylene" (second occurrence) should be deleted.

COLUMN 17

Line 27, "been lowered either" should read --decreased--.

COLUMN 19

Line 19, "xynothane" should read --Xynothane--.

COLUMN 21

Line 58, "used.)" should read --used.).--.

COLUMN 22

Line 2, "decomposed,for" should read --decomposed for--;
Line 25, "water of" should read --water measured--;
Line 32, "(GC-14B)" should read --(GC-14B--;
Line 34, "It was" should read --it was--; and
Line 62, "used.)" should read --used.).--.

UNITED STATES PATENT AND TRADEMARK OFFICE
CERTIFICATE OF CORRECTION

PATENT NO. : 7,163,665 B2
APPLICATION NO. : 10/167549
DATED : January 16, 2007
INVENTOR(S) : Kinya Kato It is certified that error appears in the above-identified patent and that said Letters Patent is hereby corrected as shown below:

COLUMN 23

Line 2, "seasoning to" should read --seasoning to the--;
Line 17, "As a" should be deleted;
Line 18, "result, it was observed that all of the concentrations were" should be deleted;
Line 19, "lowered" should be deleted; and
Line 20, "seasoning to" should read --seasoning to the--.

COLUMN 25

Line 1, "was left" should read --were left--.

COLUMN 26

Line 9, "highly decomposed" should read --well-composed--;
Line 32, "served to" should read --used in the--; and
Line 67, "Soils" should read --Soil--.

COLUMN 27

Line 29, "31 for," should read --31 for--.

COLUMN 28,

Line 13, "by th pH" should read --by the pH--.

COLUMN 29

Line 9, "tional-water" should read --tional water--;
Line 10, "functional-water" should read --functional water--; and
Line 27, "and is" should read --and are--.

UNITED STATES PATENT AND TRADEMARK OFFICE
CERTIFICATE OF CORRECTION

PATENT NO. : 7,163,665 B2
APPLICATION NO. : 10/167549
DATED : January 16, 2007
INVENTOR(S) : Kinya Kato It is certified that error appears in the above-identified patent and that said Letters Patent is hereby corrected as shown below:

<u>COLUMN 30</u>

Line 1, "functional-water" should read --functional water--;
    Line 3, "was not" should read --were not--;
    Line 5, "was detected" should read --was each detected--; and
    Line 37, "seems" should read --seem--.

Signed and Sealed this

Twenty-sixth Day of June, 2007

JON W. DUDAS
*Director of the United States Patent and Trademark Office*